US011630236B2

(12) United States Patent
Mitterhofer

(10) Patent No.: US 11,630,236 B2
(45) Date of Patent: Apr. 18, 2023

(54) AUTOMATED METHOD FOR MANAGING WEATHER RELATED ENERGY USE

(71) Applicant: Gian Carlo Mitterhofer, Houston, TX (US)

(72) Inventor: Gian Carlo Mitterhofer, Houston, TX (US)

(73) Assignee: BUILDING OPTIMIZATION TECHNOLOGIES, LLC, Houston, TX (US)

( * ) Notice: Subject to any disclaimer, the term of this patent is extended or adjusted under 35 U.S.C. 154(b) by 399 days.

(21) Appl. No.: 16/437,308

(22) Filed: Jun. 11, 2019

(65) Prior Publication Data

US 2019/0310393 A1    Oct. 10, 2019

Related U.S. Application Data

(63) Continuation of application No. 16/196,738, filed on Nov. 20, 2018, now abandoned.

(60) Provisional application No. 62/589,398, filed on Nov. 21, 2017.

(51) Int. Cl.
*G01W 1/00* (2006.01)
*F24F 11/46* (2018.01)

(52) U.S. Cl.
CPC ............... *G01W 1/00* (2013.01); *F24F 11/46* (2018.01); *G01W 2001/006* (2013.01)

(58) Field of Classification Search
CPC .... F24F 11/46; G01W 1/00; G01W 2001/006
See application file for complete search history.

(56) References Cited

U.S. PATENT DOCUMENTS

| 6,366,889 B1* | 4/2002 | Zaloom ............ G06Q 10/06375 705/400 |
| 2011/0119042 A1* | 5/2011 | Johnson ................. G06Q 50/06 703/6 |
| 2012/0259474 A1* | 10/2012 | Razum .................... G06Q 50/06 700/291 |
| 2015/0142179 A1* | 5/2015 | Ito ............................ F24F 11/62 700/276 |
| 2015/0244591 A1* | 8/2015 | Brown ..................... H04L 12/12 709/223 |
| 2016/0005015 A1* | 1/2016 | Curtis ................... G06Q 20/145 705/40 |
| 2016/0110736 A1* | 4/2016 | Sloss ...................... G06Q 20/14 705/7.31 |
| 2016/0195887 A1* | 7/2016 | Shiel ................... F24D 19/1048 700/291 |
| 2017/0212668 A1* | 7/2017 | Shah .................... G05B 19/048 |

(Continued)

OTHER PUBLICATIONS

Hewitt, Your Texas Electricity Usage Data, Electricity Match, 2015 (Year: 2015).*

(Continued)

*Primary Examiner* — Kyle R Quigley
(74) *Attorney, Agent, or Firm* — Lloyd & Mousilli; Jeoyuh Lin; Feras Mousilli

(57) ABSTRACT

An automated method for managing weather related energy usage in a physical structure having and address using preexisting smart meters, preexisting weather stations and preexisting energy portals and with a dynamic energy model connected to a network.

19 Claims, 43 Drawing Sheets
(35 of 43 Drawing Sheet(s) Filed in Color)

(56) References Cited

U.S. PATENT DOCUMENTS

2017/0371308 A1* 12/2017 Ghosh .................... G05B 15/02

OTHER PUBLICATIONS

Hewitt, Your Texas Electricity Usage Data, Electricity Match, 2015, Clean Copy (Year: 2015).*
TMPromotions, Exactly How Smart is Your Smart Meter, Texas Monthly, 2017 (Year: 2017).*

* cited by examiner

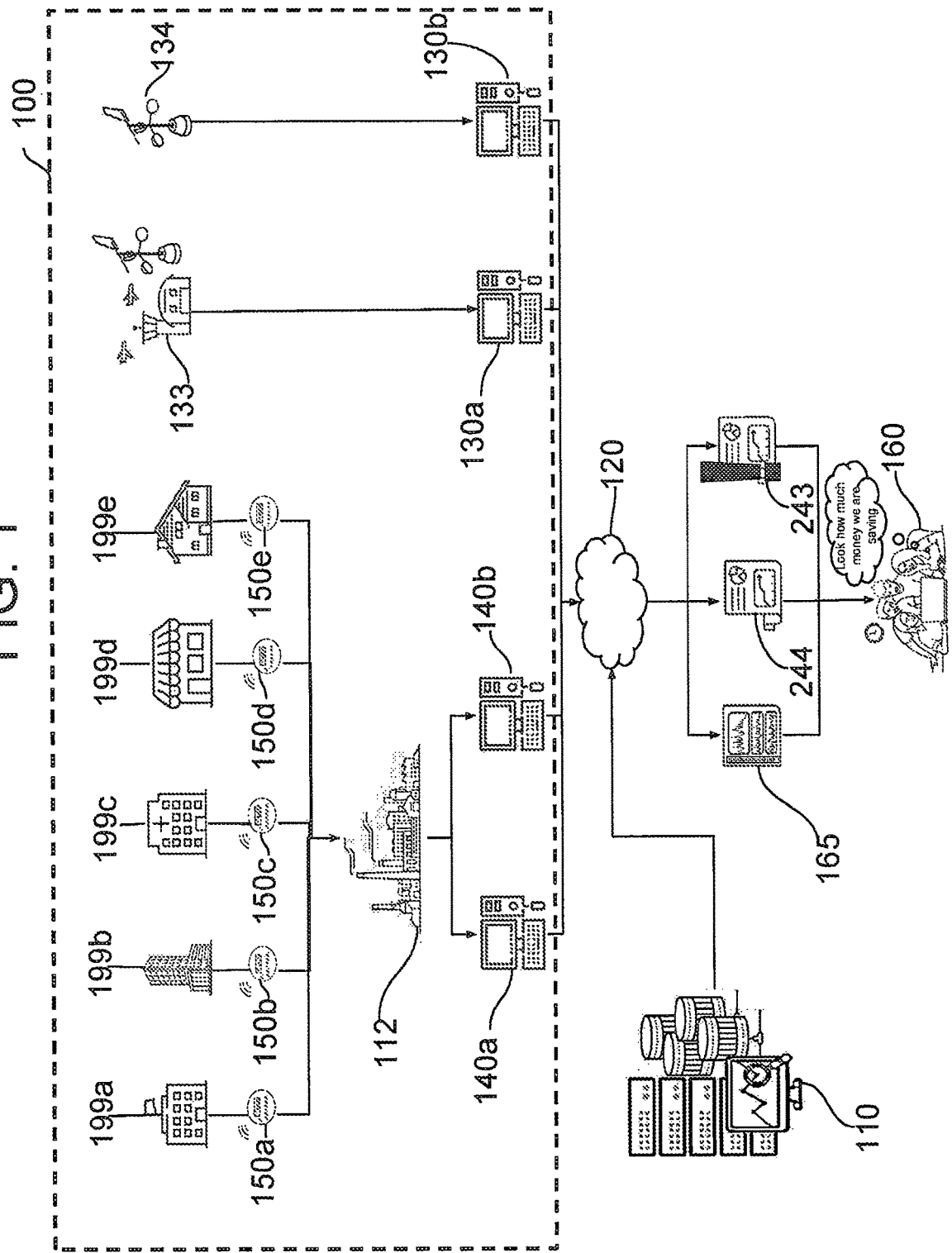

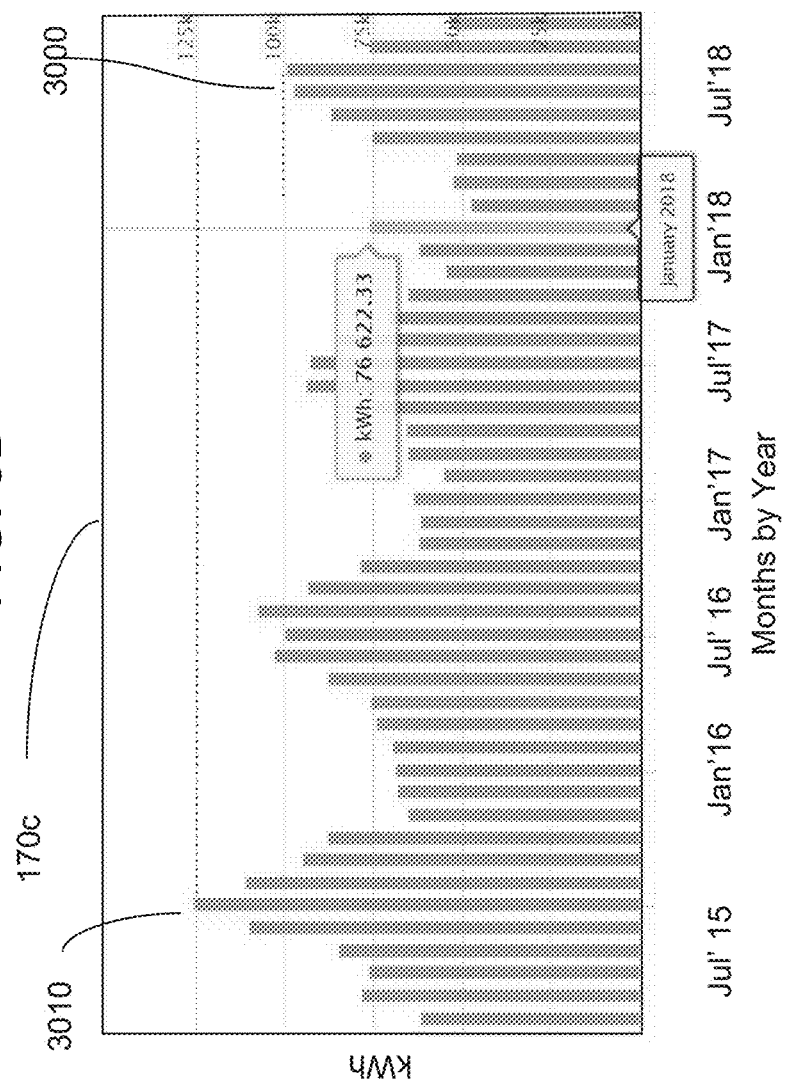

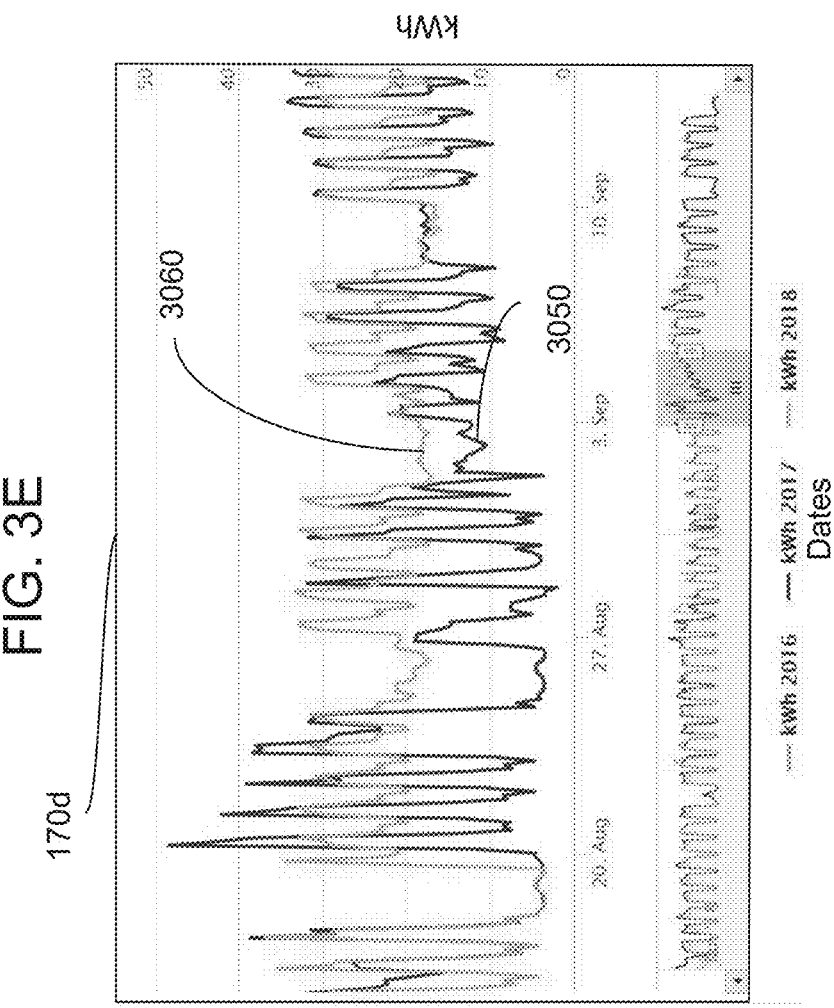

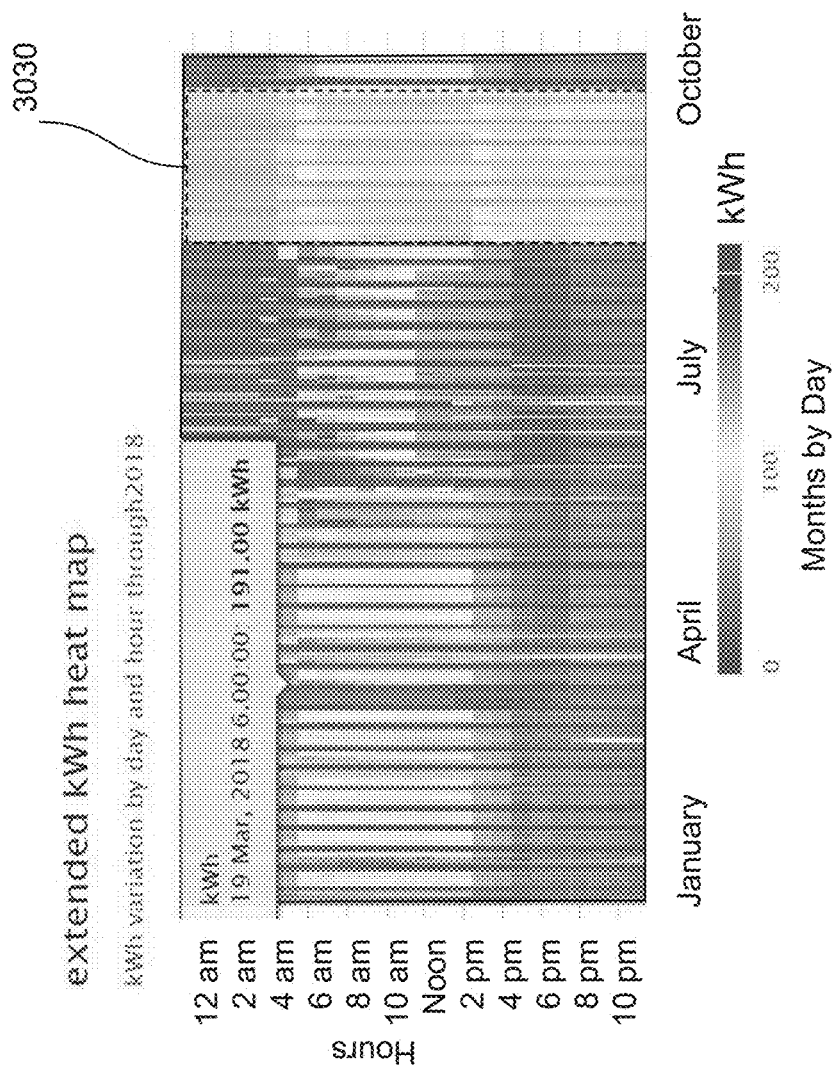

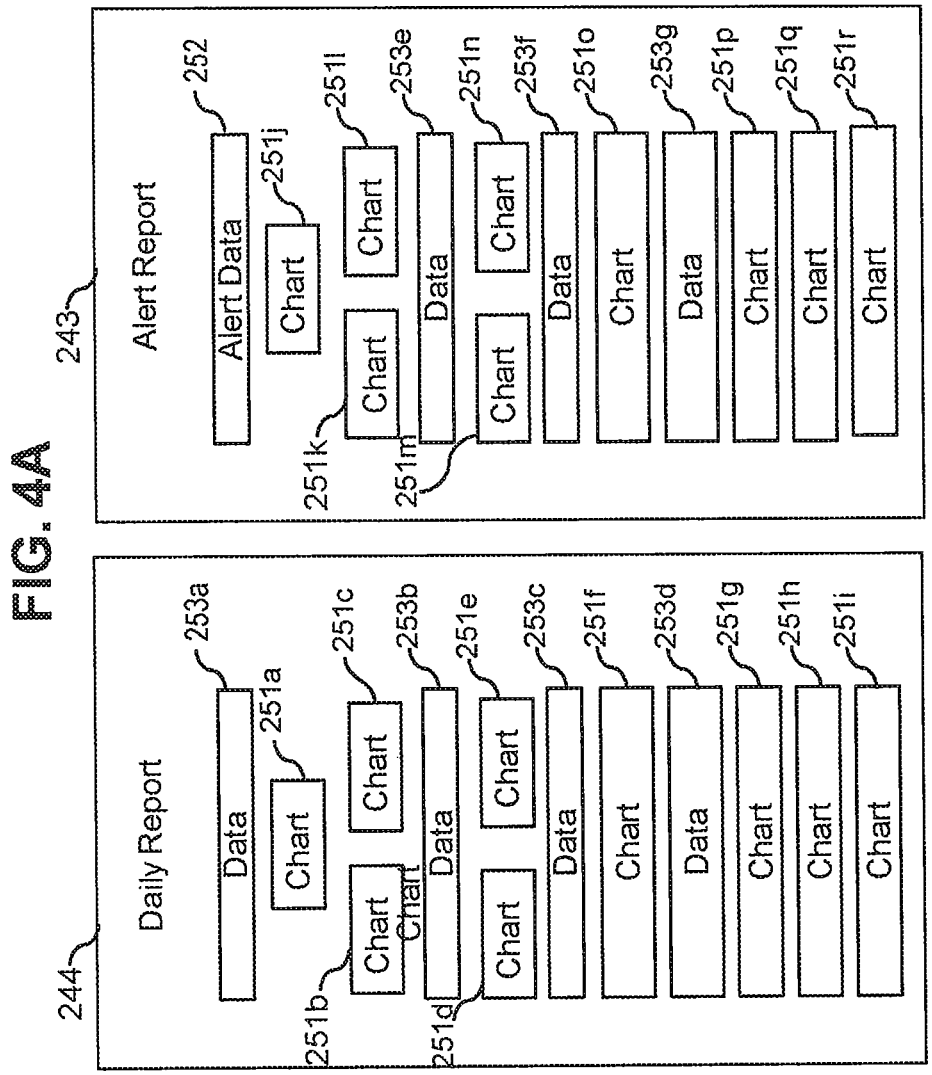

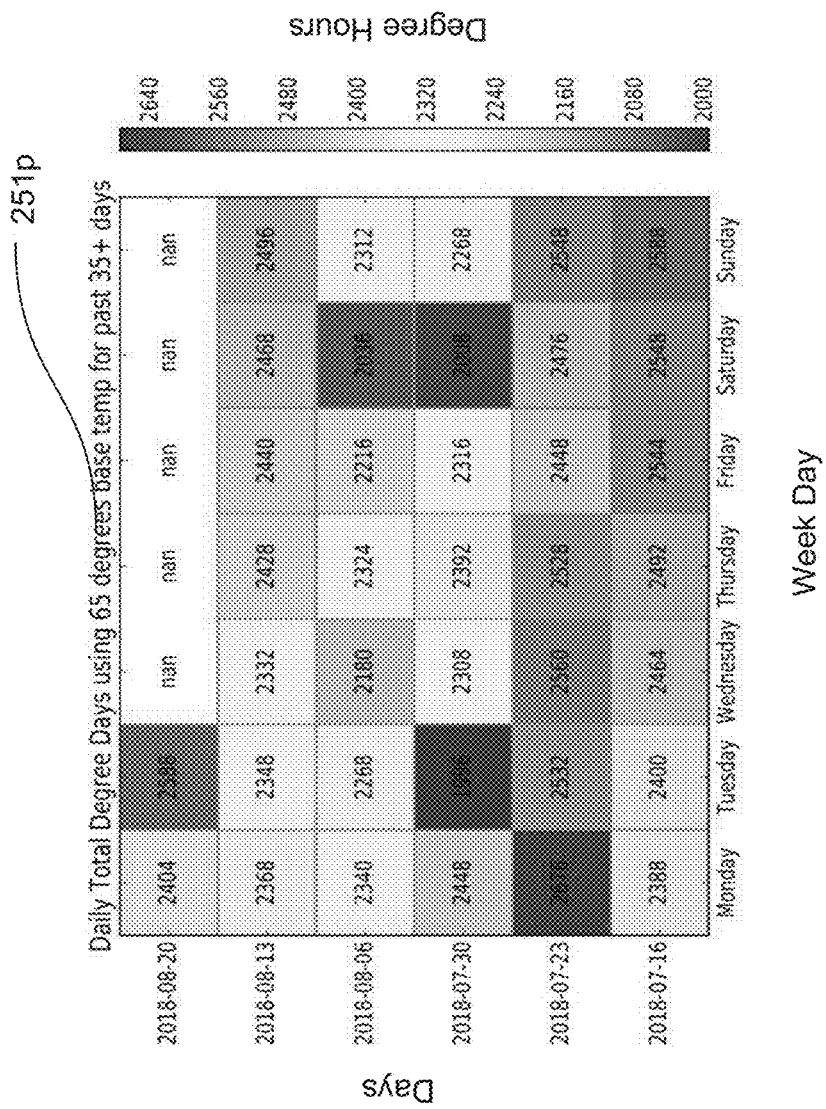

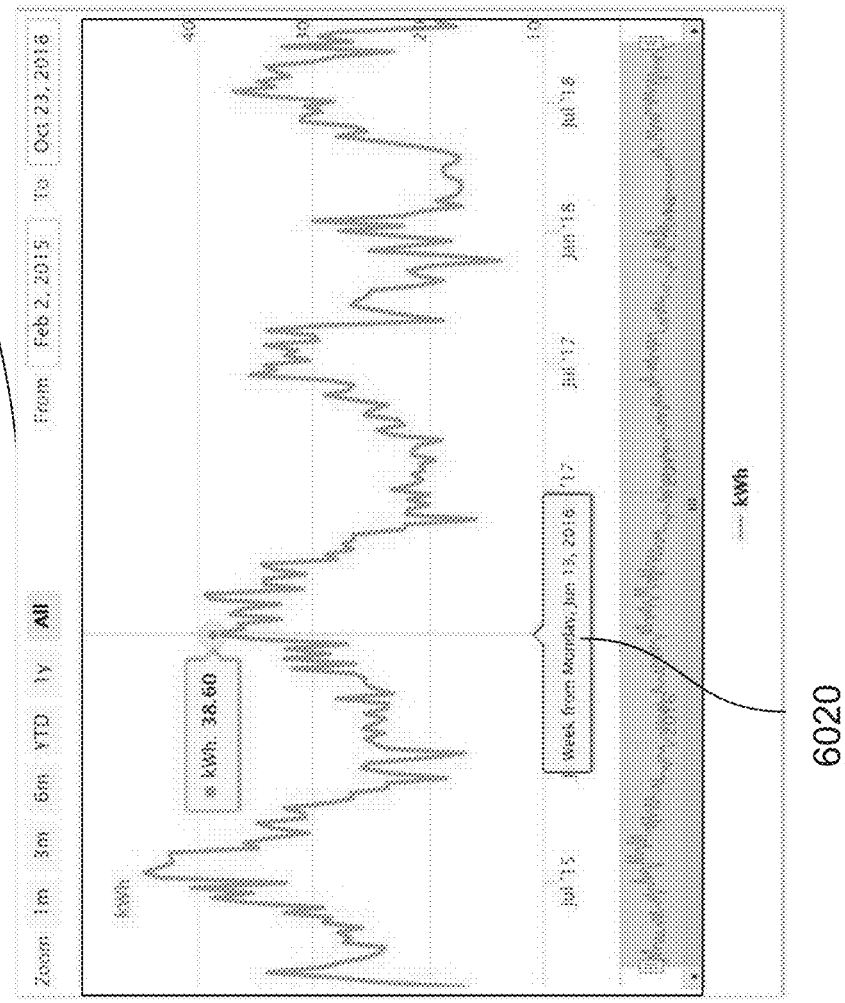

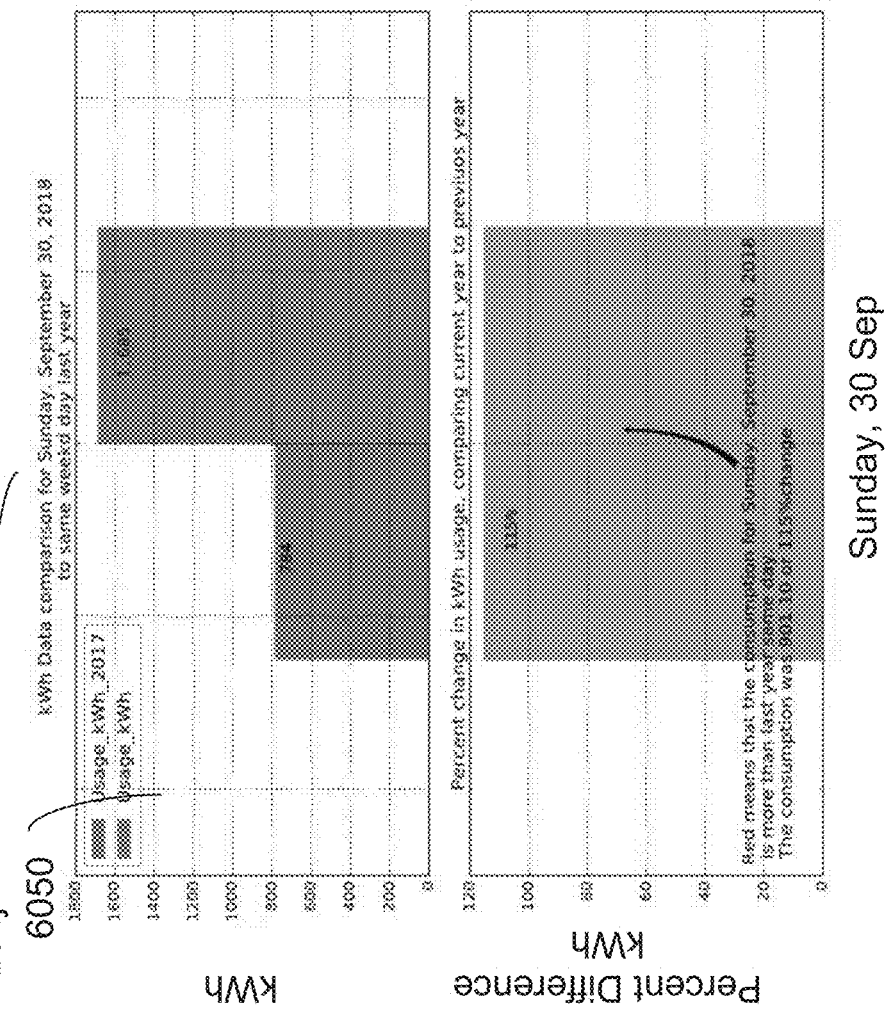

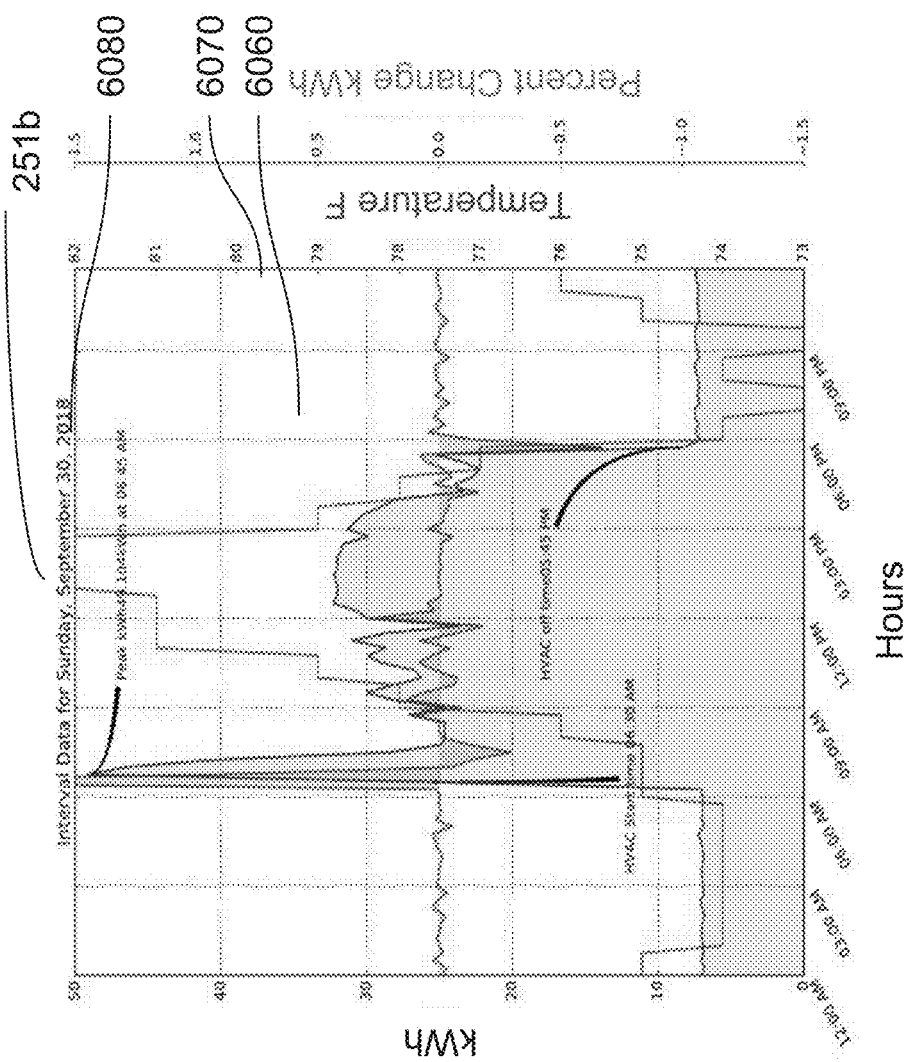

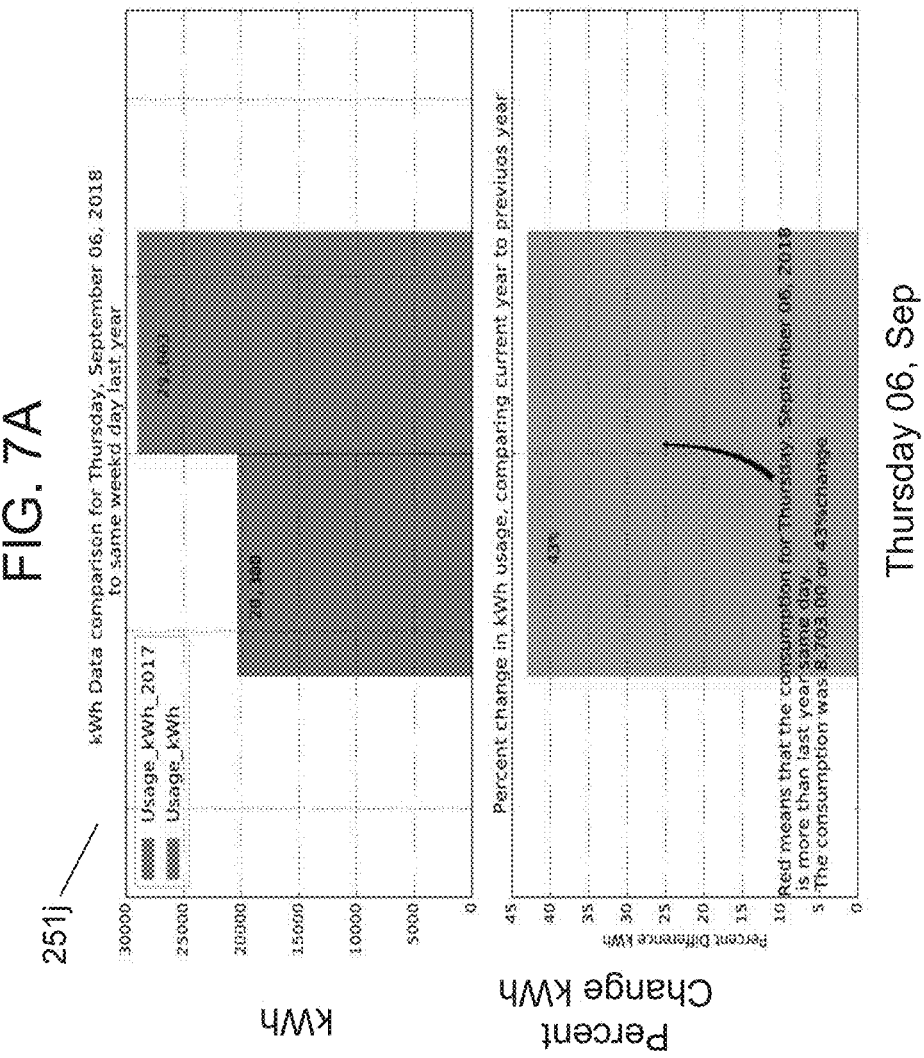

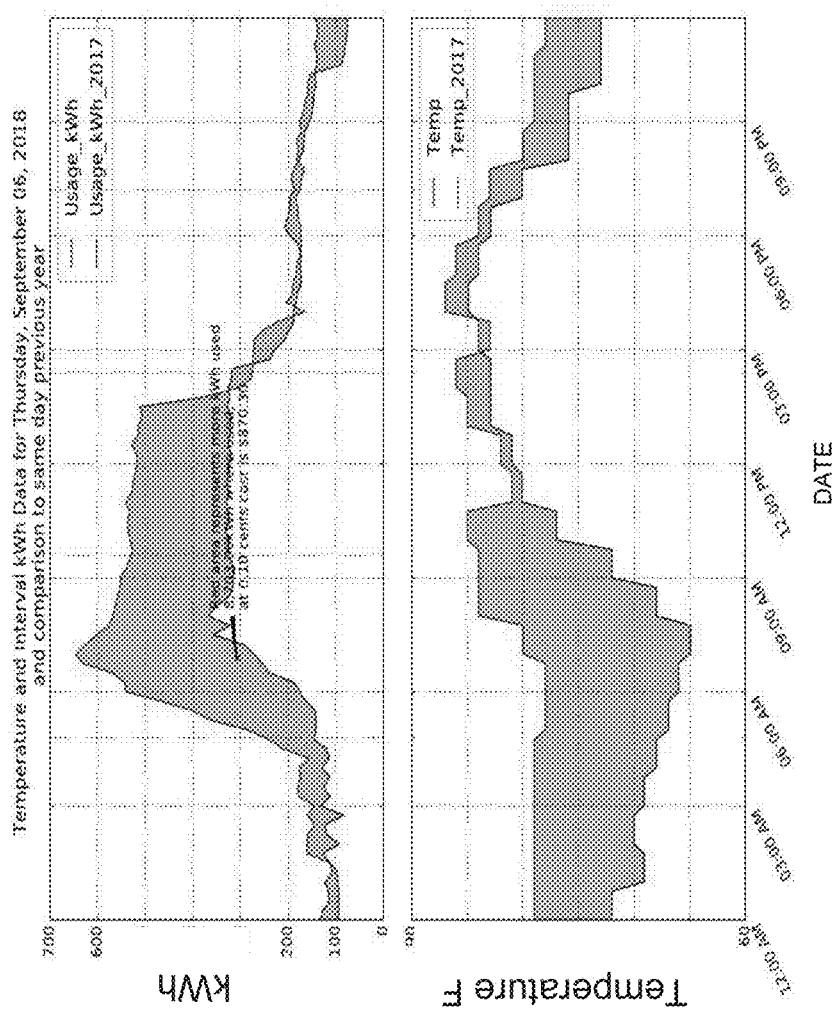

AUTOMATED METHOD FOR MANAGING WEATHER RELATED ENERGY USE

CROSS REFERENCE TO RELATED APPLICATIONS

The present application is a continuation and claims priority to and the benefit of co-pending U.S. Provisional Patent Application Ser. No. 62/589,398 filed on Nov. 21, 2017 entitled: Weather Related Management System. and non provisional patent application Ser. No. 16/196,738 filed Nov. 20, 2018. These references are hereby incorporated in its entirety.

FIELD

The present embodiment generally relates to a method for controlling energy usage in a facility using a weather data and temperature data collection energy information system.

BACKGROUND

A need exists for a method for data collection that automatically and continuously identifies and monitors energy conservation opportunities, monitors and calculates energy efficiency metrics and energy demand in a plurality of multilevel buildings simultaneously using preexisting smart meters, preexisting energy portables and preexisting weather stations.

The present embodiments meet these needs.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

As the color drawings are being filed electronically via EFS-Web, only one set of the drawings is submitted.

The detailed description will be better understood in conjunction with the accompanying drawings as follows:

FIG. 1 depicts an overview of the weather related system for a structure defined by an address according to one or more embodiments of the method.

FIGS. 2A-2E depicts a server with processor and non-transitory computer readable medium according to one or more embodiments of the method.

FIGS. 3A-3E depicts the system user interface with interactive graphs according to one or more embodiments of the method.

FIG. 3F depicts a calendar year of energy usage graph according to one or more embodiments of the method.

FIG. 4A depicts outline reports created by the system according to one or more embodiments of the method.

Figure 4B:
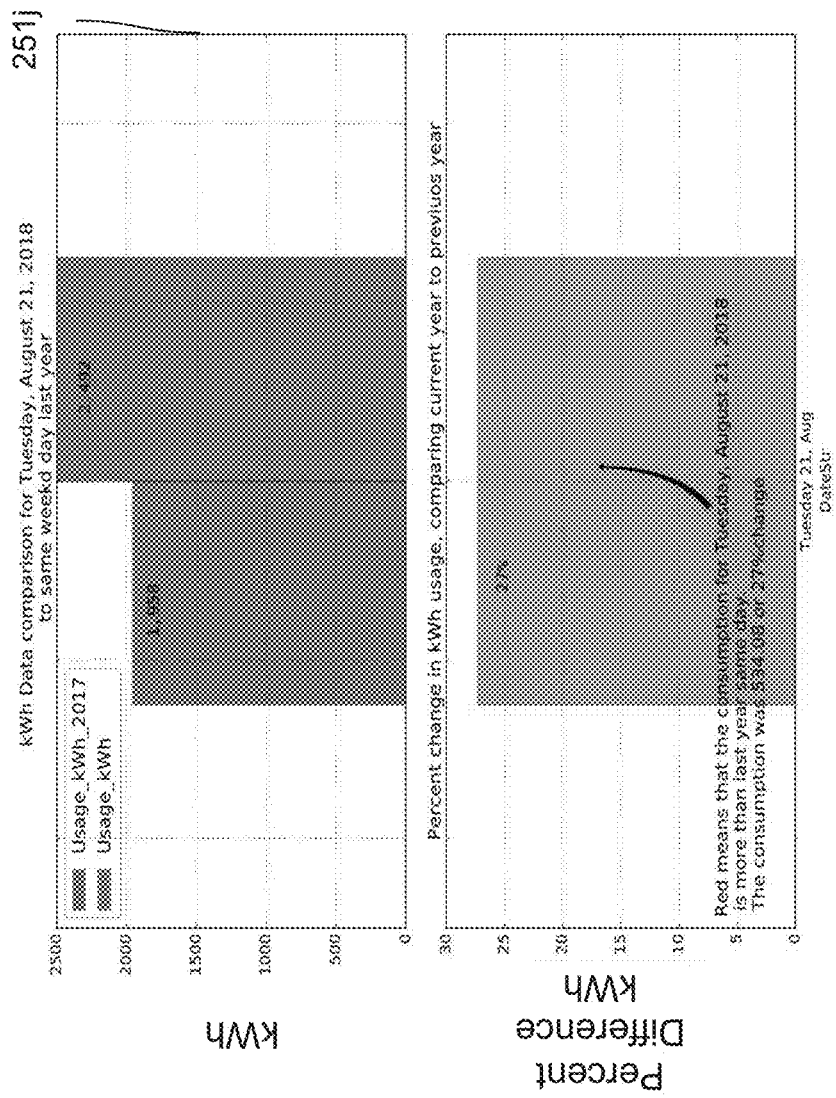

FIG. 4B depicts a portion of a daily report from the dynamic energy model according to one or more embodiments of the method.

Figure 4C:
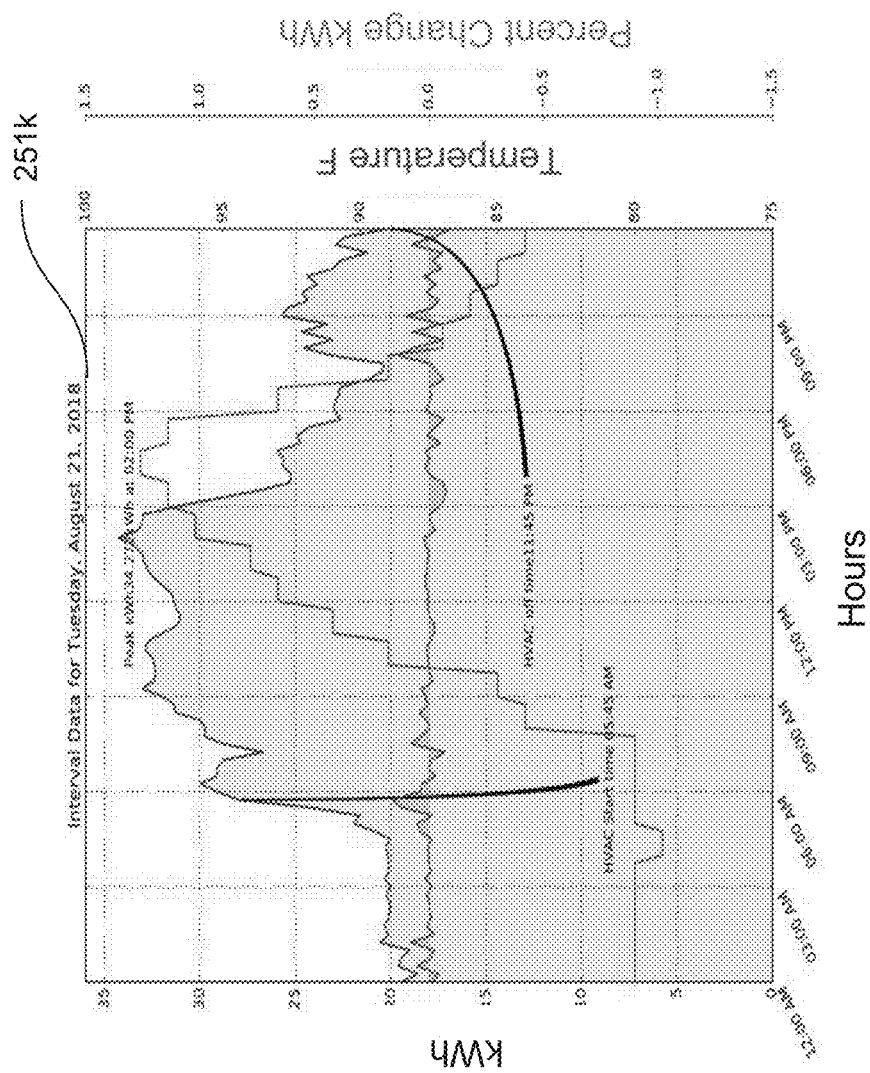

FIG. 4C depicts a bar graph of a daily report from the dynamic energy model according to one or more embodiments of the method.

Figure 4D:
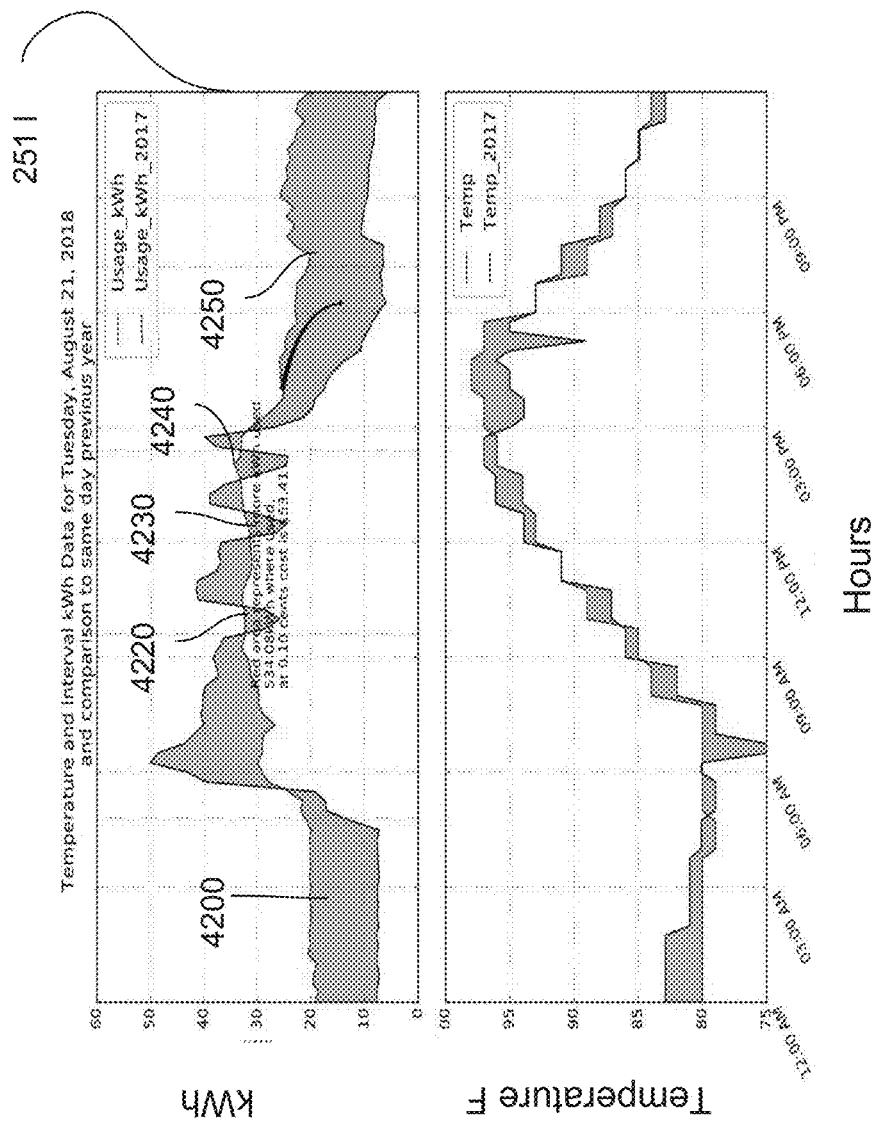

FIG. 4D depicts a line graph of a daily report from the dynamic energy model according to one or more embodiments of the method.

Figure 4E:
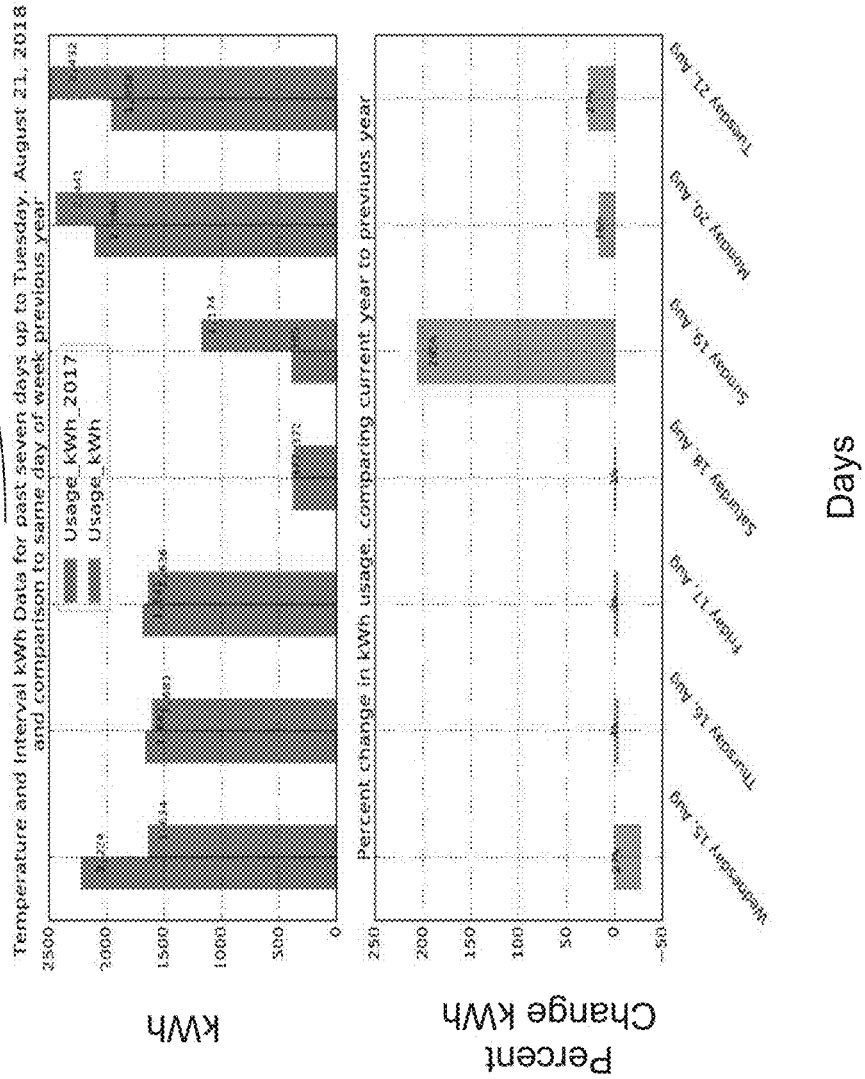

FIG. 4E depicts a line graph a daily report from the dynamic energy model according to one or more embodiments of the method.

Figure 4F:
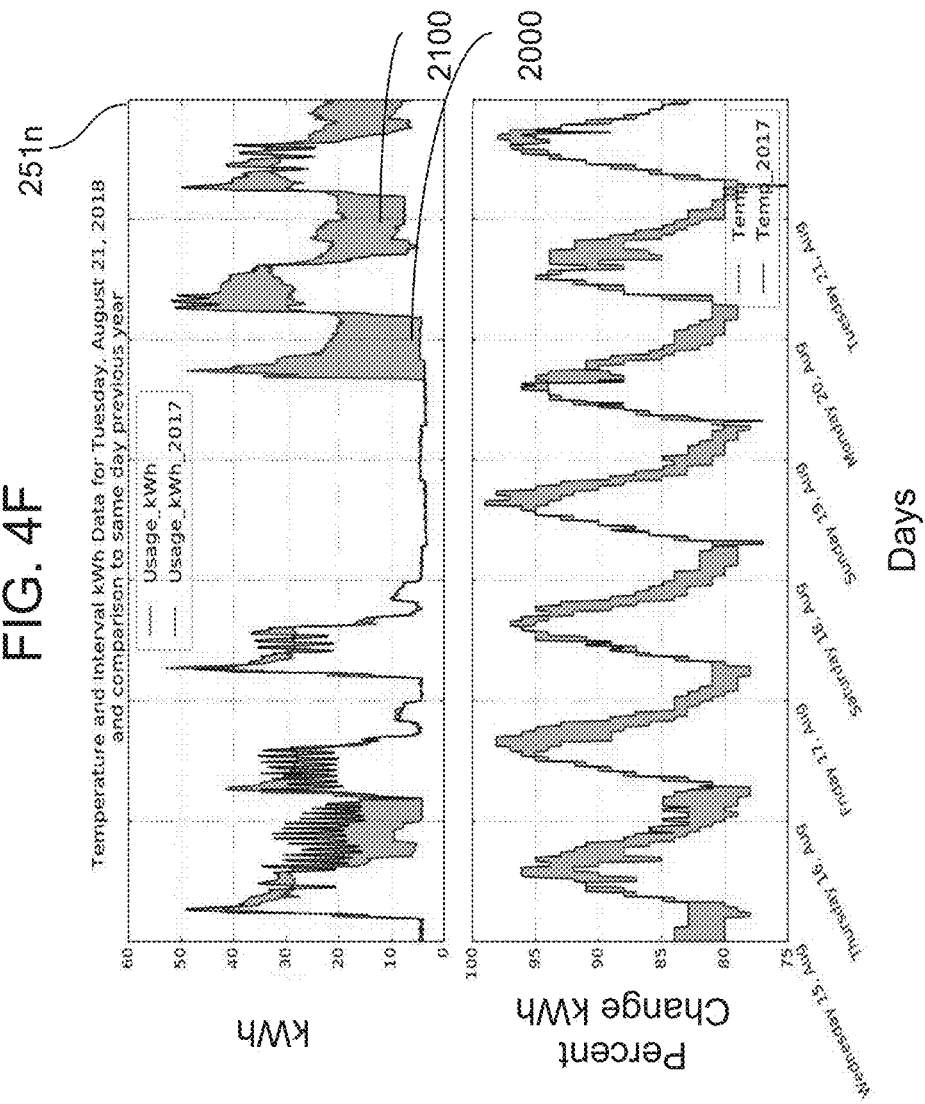

FIG. 4F depicts an analysis portion of a daily report from the dynamic energy model according to one or more embodiments of the method.

Figure 4G:
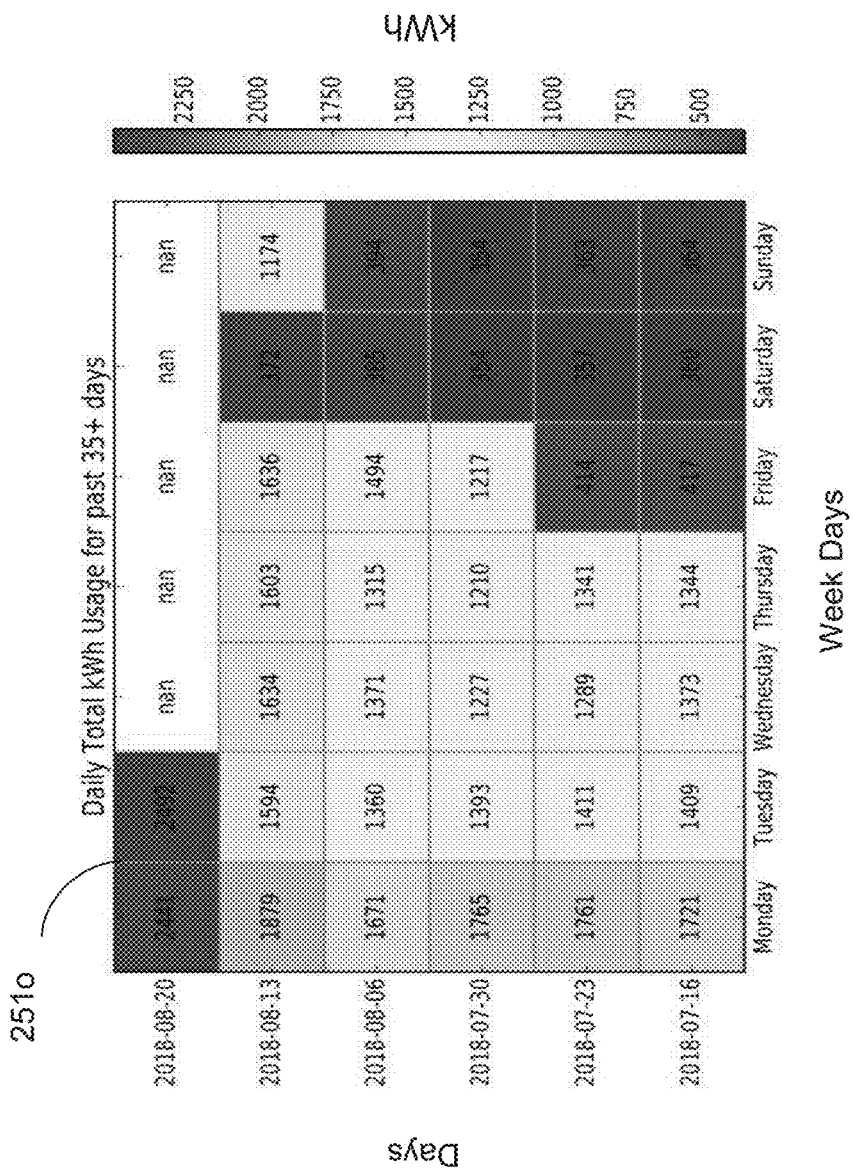

FIG. 4G depicts a 7 day bar chart of a daily report from the dynamic energy model according to one or more embodiments of the method.

FIG. 4H depicts a 7 days line chart of a daily report from the dynamic energy model according one or more embodiments of the method.

Figure 4I:
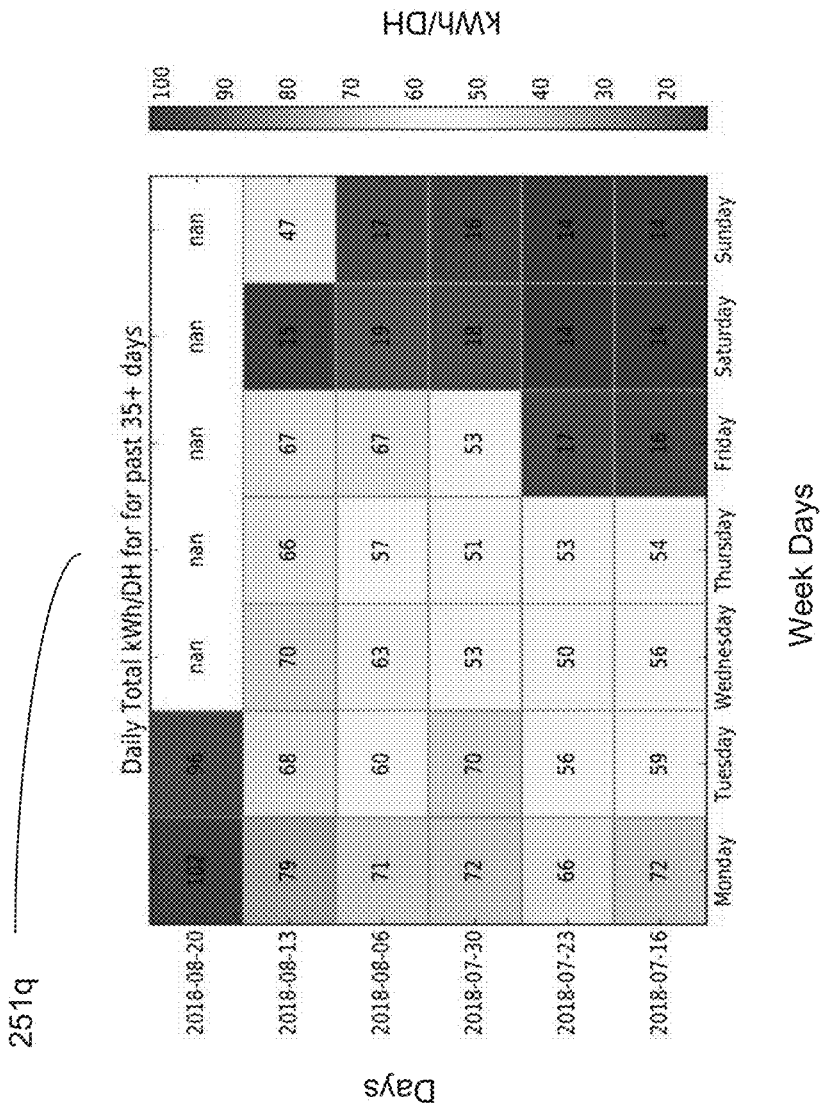

FIG. 4I depicts an analysis portion of a daily report from the dynamic energy model according to one or more embodiments of the method.

Figure 4J:
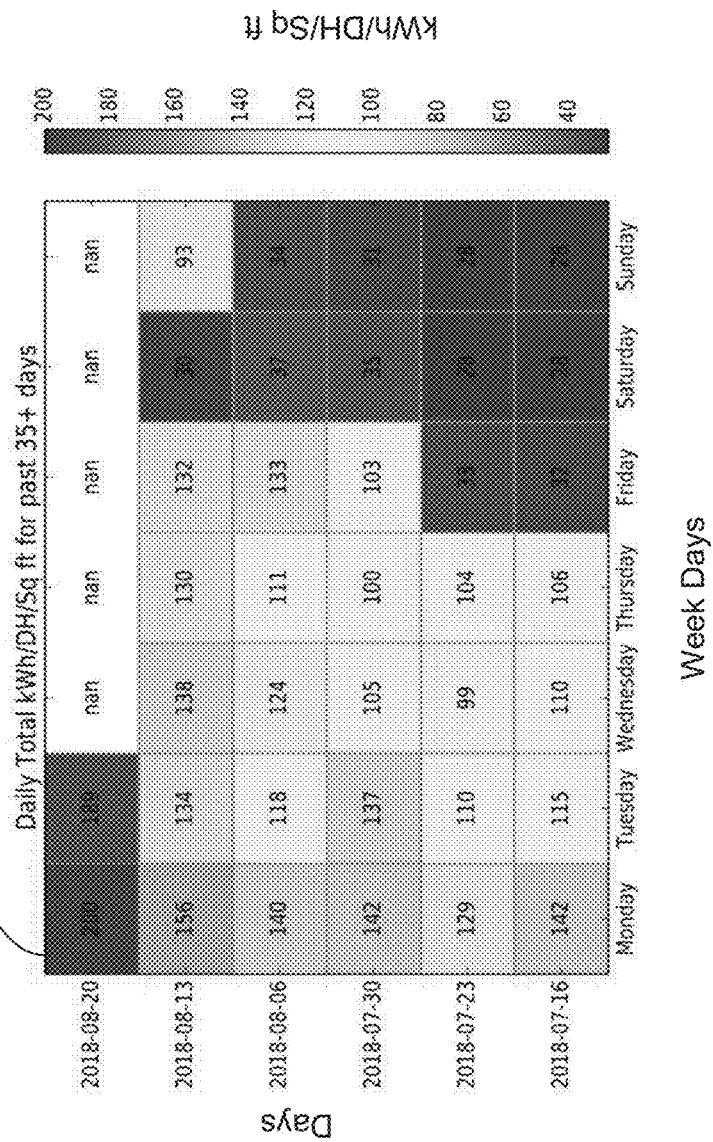

FIG. 4J depicts a 30 day heat map of a daily report from the dynamic energy model according to one or more embodiments.

Figure 4K:
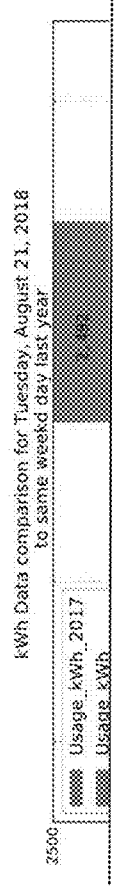

FIG. 4K depict the data section of the alert report from the dynamic energy model according to one or more embodiments.

Figure 5:
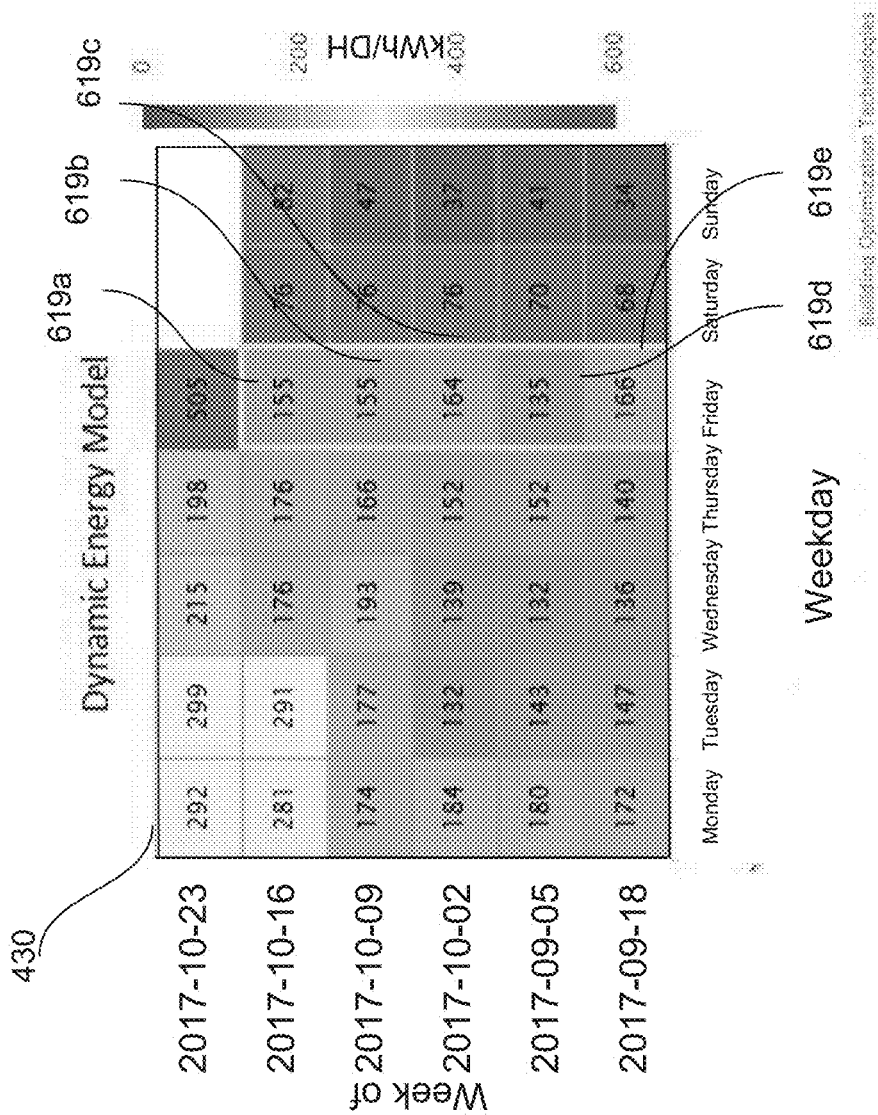

FIG. 5 is a graph showing another portion of a daily report from the dynamic energy model according to one or more embodiments of the method.

FIGS. 6A-6J depicts the user interface with interactive graphs for example 2 according to one or more embodiments of the method.

FIGS. 7A-7I depicts the alert report for example 3 according to one or more embodiments of the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The invention relates an automated method for managing weather related energy use.

The automated method for managing weather related energy usage involves electronically connecting a processor with a non-transitory computer readable medium to a network.

In the method, the next step involves installing a dynamic energy model in the non-transitory computer readable medium then inputting an address for at least one physical structure into the dynamic energy model, wherein each physical structure is defined by an address.

The method next step involves electronically connecting the processor with at least one pre-existing weather station portal located within a preset distance from each physical structure, wherein each weather station portal provides a continuous stream of weather data including ambient temperature data external to the physical structure to the dynamic energy model.

Simultaneously while electronically connecting to a pre-existing weather station portal, the method has the processor electronically connect with at least one pre-existing energy portal, wherein each pre-existing energy portal provides a continuous stream of interval electrical usage for each physical structure and a continuous stream of ambient temperature data external to the same from a plurality of devices including at least one pre-existing smart meter, wherein each pre-existing smart meter is mounted onto or within a preset distance of each physical structure.

The method involves electronically connecting at least one client device having a client device processor and a display to the network. The client device is connected to the network for receiving and displaying at least two interactive graphs and alert reports produced by the dynamic energy model for each physical structure defined by an address while simultaneously using data from each pre-existing weather station portal and each pre-existing energy portal.

The method uses a dynamic energy model that includes instructions, which when executed by a processor performs the steps of: harvesting and compiling energy interval usage data and temperature interval data at predefined intervals; conditioning the harvested energy interval usage data and temperature interval data forming conditioned harvested data, wherein conditioning includes instructions for cleaning, indexing, and slicing the harvested data; using preset threshold values stored in the dynamic energy model to generate alert reports for each physical structure; generating groups of interactive graphs using conditioned harvested data and generated alert reports for each physical structure; transmitting the groups of interactive graphs with alert reports to at least one client device for continuous monitoring and control; and calculating and storing energy metrics for each physical structure.

The calculating and storing of energy metrics can be for a day of conditioned harvested data; a group of six days of conditioned harvested data; and a group of thirty-five days of conditioned harvested data.

The method uses a dynamic energy model to applying statistical modeling to the harvested data utilizing filtering to remove outliers in the stored energy metrics providing improved energy metrics.

The method uses a dynamic energy model that also determines percent changes in improved energy metrics for each physical structure for one day of conditioned harvested data and for a group of days of conditioned harvested data simultaneously; and compares a percent change to preset threshold values, and if the percent change does not exceed the preset threshold values automatically generating a daily report and if the percent change exceeds the preset threshold values generate an alert report to the client device for each structure defined by an address.

In embodiments, the method adds the step of activating harvesting of energy usage and temperature internal data at a preset start time.

In embodiments, the method uses a counter in the dynamic energy model to identify i a quantity of physical structures to be monitored.

In embodiments, the method collects weather data from airports or a weather station within from 60 miles to 100 miles of each physical structure.

In embodiments, the method generates an alert report that defines each threshold value exceeded by hour and percent change in energy usage by hour for each physical structure.

In embodiments, the method determines a maximum energy usage day and a minimum energy usage day using the dynamic energy model and these values are included in the interactive graphs.

In embodiments, the method uses the dynamic energy model to calculate cooling and heating degrees days that are highlighted and presented on the interactive graphs.

In embodiments, the dynamic energy model resamples energy data and the temperature data in 24-hour intervals to create a 24-hour report.

In embodiments, the dynamic energy model gathers user information on users and physical attributes of physical structures and presents user information in the interactive graphs.

In embodiments, the method generates a dictionary for energy metrics to use with the interactive graphs by the dynamic energy model.

In embodiments, the dynamic energy model harvests energy data every 15 minutes or less and temperature data every 5 minutes or less from each energy portal.

In embodiments, the method uses using a standard base temperature of 60 degrees Fahrenheit degrees and temperature interval data every 15 minutes to determine temperature degree values for use in the interactive graphs.

In embodiments, the method uses the dynamic energy model to generate sets of historical monthly energy heat maps that enable visualization of a last 30 days for energy usage by hour per day with a color dependent value related to a color palette by the dynamic energy model.

In embodiments, the method uses the dynamic energy model to generate monthly historical heat maps to identify patterns anomalies and identify opportunities of energy conservation for the physical structure by the dynamic energy model.

In embodiments, the dynamic energy model maps resampled energy data to comparable days of a week and overlapping 365-day data sets on the map to compare a current year versus a previous year by month, by day, and by hour for each physical structure.

In embodiments, the dynamic energy model calculates changes in energy metrics related to equipment startup and equipment shutdown times for a physical structure.

In embodiments, the dynamic energy model calculates energy metrics for a physical structure, wherein the energy metrics include: total energy use for one day, total energy use for six days, and total energy usage for thirty five days; maximum energy values for one day, maximum energy values for any six days and maximum energy value for any thirty five days; minimum energy values for one day, minimum energy values for any six days, and minimum energy values for any thirty five days, and mean energy use for any group of days.

The dynamic energy model is used to calculate the last day percent change, this value is calculated comparing the last day energy metrics to the average of the last five corresponding days in the last five same weekdays and comparing it to stored threshold values, and issuing a daily report. If the percent change does exceed the stored threshold values, the server automatically generates an alert report to the client device for each structure defined by an address.

The dynamic energy model automatically and on 15 minutes intervals verifies if there is new data available in the energy and temperature portals and harvests energy interval data and temperature interval data either identified by the structure defined by an address forming harvested energy interval and temperature interval data.

The embodiments reduce the time used by clients to gather and process energy information necessary to make energy management decisions. The network, server, processor and non-transitory computer readable medium to automatically and continuously check the energy and temperature portals for new data.

As soon as new data is available, the method updates the databases and creates all the analysis for the client to review and take actions with. The method is able to update the databases by exchanging information between the systems and the energy and weather portals.

The method prevents waste by automatically and continuously doing the work for the client, saving countless hours of work in addition to wasted energy.

The method creates alert reports on time-sensitive manner so that the client is able to take corrective actions.

The method automatically performs and improves the energy management functions and analysis by finding waste in energy consumption.

The method fosters improved quality of life, prevent premature death, and costly illnesses by using its benchmarking capabilities to allow identification of inefficient energy use in multi buildings mainly for HVAC and other major equipment, which allows multi buildings to maintain a dryer and properly ventilated environment. The dryer and properly ventilated environment lowers the risk of illnesses and mold growth and reduces buildup of air pollutants. Hence improving occupant comfort, productivity, enhancing general health, which avoids costly illness and premature dead.

According to the EPA Americans, on average, spend approximately 90 percent of their time indoors, where the concentrations of some pollutants are often 2 to 5 times higher than typical outdoor concentrations. Moreover, noting that indoor Ambient (outdoor air pollution) is a major cause of death and disease globally, the health effects range from increased hospital admissions and emergency room visits, to increased risk of premature death. The World Health Organization estimates that 4.6 million people die each year from causes directly attributable to air pollution. Many of these mortalities are attributable to indoor air pollution. Worldwide more deaths per year are linked to air pollution than to automobile accidents.

The method prevents environmental harm by creating and sending automated alert reports to clients when alert thresholds have been met, therefore, reducing the wasted energy consumption by fostering energy usage savings, using substantially less energy and reducing the amount of carbon dioxide produced to the environment. Issues may include but not limited to client's issues with HVAC systems scheduling process, or human error, a facility manager forgetting to change setting on HVAC units, and leaving the units on for one for months a time. According to the U.S. Department of Energy in the United States alone, buildings account for almost 40 percent of national CO2 emissions and outconsume both the industrial and transportation sectors.

The method reduces owner costs of energy consumption by providing alert reports that are to see and alerts that immediately pushed to a cell phone or their client device.

The method reduces owner cost of energy consumption by providing daily report with analysis that can be compared to base year kWh usage to determine optimal timing for equipment rehab or replacement.

The method optimizes the use of HVAC equipment, thus reducing the owner cost of energy consumption by providing daily reports with analysis which allows client to review optimal HVAC start and stop times, which extends the life of the equipment by using HVAC optimally.

The following terms are used herein:

The term "alert reports" refers to a daily report that tells a client's device that an issue or anomaly is occurring in the structure defined by an address, such as a heating ventilation and air conditioning has been left on after hours.

The term "automatically generate" refers to a process performed without any human assistance. Such as the harvesting of interval energy and weather data, the alert reports and analysis. For example the invention automatically crawls the Internet to harvest data a process that a client would normally could not perform due to time and resources constraints it is done generated automatically by the invention.

The term "automated" refers to applying the principles of automation to the process of gathering interval energy and temperature data, conditioning, processing and issue of energy related reports.

The term "Big Data" refers to extremely large data sets that many be analyzed computationally to reveal patterns, trends and associations. The invention crawls the Internet every 15 minutes to harvest, raw data, such as energy and weather interval data, and performs analysis which could not be performed by the client or even an excel sheet, due to the extreme size of the data sets.

The term "client device" refers to a laptop, computer, tablet, smartphone, or similar bidirectional device with a processor and memory.

The term "color scale" can refer to a specialized label object that displays a color map and the object's scale. In the color scale, the lowest kWh and temperatures are represented in blue, the low mid rage kWh and temperatures are represented in yellow, the high mid-range kWh and temperatures are represented as orange, and the high kWh and temperatures are represented in red for the structure defined by an address 199*a*

The term "conditioned harvested data" or "data conditioned" refers to cleaning, indexing and slicing of harvested data. For example, cleaning is the removal of duplicated data. Indexing is assigning operators to data to provide quick and easy access across a wide range of energy values and temperature values. Another example, slicing of harvested data includes filtering the data by time intervals, such as 24 hours, 36 hours, 120 hours or another user defined unit.

The term "Crawl" refers computer instructions which systematically browse the Internet. For example the invention automatically crawls the internet to the energy and temperature portals to harvest data.

The term "daily report" refers to a report containing analysis on energy usage and graphs of energy metrics.

The first illustration shows a bar-chart with last day energy usage versus the same day previous year and a bar-chart below shows the excess or defect of energy usage, second illustration shows a line-graph with the 15 minutes interval energy usage in kWh during the day showing the maximum energy usage and the minimum inferring on and off of heating ventilation and air conditioning units, third illustration shows a line-graph in 15 minutes interval a comparison behavior in energy usage for that day versus previous year same weekday showing excess in red or defect in green color, line-graph below shows for that day comparison temperature in one hour interval behavior with same weekday last year. Fourth illustration shows a comparative bar-chart of last seven days energy usage for current versus last year weekdays, below a chart-graph showing the excess in red or defect in green color. Fifth illustration shows a comparative seven days line-graph of daily energy usage behavior with previous year, excess usage in red color or defect usage in green color, graph below shows comparative seven days line-graph of daily behavior of temperature with previous year, excess temperature in red color or defect in green color; facilitating correlation between energy use and temperature. Next illustrations are a thirty five day analysis showing four sets of heat maps for the structure defined by the address. The first set of heat maps shows energy usage per day for the structure defined by the address. The second set of heat maps shows total degree hours per day for the structure defined by the address. The third set of heat maps show kilowatt per hour usage per degree day for the structure defined by the address. The fourth set of heat maps shows kilowatts per hour usage per degree day per square foot of the structure defined by the address.

The term "DH" or "Degree Hours" refers the units use to determine the heating or cooling requirements, referring to base temperature such as 65 degree Fahrenheit, by hour. For example at 11 am the temperate is 75 degree Fahrenheit therefore the degree hours for the 11 am is 10 DH.

The term "dictionary" refers to an unordered key-value-pair set of variables save to memory.

The term "dynamic energy model" refers to a mathematical procedure that use conditioned harvested energy and temperature interval data with conditioned energy and temperature interval data to produce the daily report and an alert report if an threshold is exceeded. The dynamic energy model compares last day energy usage against the mean of the similar five days of the five previous weekdays; previously the mean of the similar weekdays of the last 5 weeks has been analyzed and conditioned of any outlier so the mean value is representative to obtain a percent change. If percent change is equal or bigger than the alert threshold established, an alert is issue to client devices for corrective action. To show a whole image of the energy usage, the model calculates energy usage by different periods including but not limited to: (i) Last Day: energy usage, maximum energy usage during a day and the date and time of the pick (kilowatts), percent change of energy usage; (ii) Last Six Days: total energy usage, day of maximum energy usage and value and percent change of energy usage; (iii) Last Forty Days: total energy usage, day of maximum energy usage and value, day of maximum daily energy usage per facility area per degree-hour and its value (kWh/DH/SF)

The term "harvested energy interval and temperature interval data" refers to the raw data collected from the energy portals, such as Smart Meter Texas or CenterPoint Energy Demand & Energy Information System, and the weather portals and energy portals.

The term "HVAC" refers to heating, ventilation and air conditioning.

The term "energy conservation" refers to reducing energy through the use. For example not forgetting to turn off heating ventilation and air conditioner systems when not used or not needed is energy conservation.

The term "energy metrics" refers to values of interval energy in kilowatts per hour (kWh) every 15 minutes, values of interval load in kilowatts every 15 minutes, temperature is arranged in intervals every 60 minutes; these values can be manipulated arithmetically; degree-hour is another metric obtained by subtracting from temperature values the base-temperature of 65 degrees Fahrenheit. The term "energy portals" refers to a website that provides interval energy data from smart meters or interval data recorders (IDR) by a unique electrical service identifier or electric service identifier (ESI), such as Smart Meter Texas and CenterPoint Energy Demand & Energy Information Systems (DEIS).

The term "heat map" refers to a graphical representation of two variables such as energy and temperature interval data where the individual values contained in a matrix are represented as colors related to a scale with the x-axis as the time, y-axis hours, and a color scale representing the kWh value, usually with blue as a lower value of kWh and red a higher value of kWh consumption.

The term "historical" refers to the previously harvested energy and weather condition interval data.

The term "interactive graph" graphs that allow a two-way flow of information between a system and client; responding to a client's input.

The term "interval data" refers to data in which the increments are known, consistent and measurable, such as 15 minute interval energy data, which is the energy data that is collected from the smart meters every 15 minutes.

The term "maximum and minimum dates of energy usage values" refers to specific days when a structure has a maximum energy use or minimum energy use in a defined period of time.

The term "non-transitory computer readable medium" refers to a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "network" refers to a satellite network, a cellular network, a global communication network, a local area network, a wide area network, a fiber optic network or combinations thereof.

The term "overlapping annual data" refers to ordering the interval data on the weekday bases. That is to order the first weekday of current year to the first weekday of other years so that all weekdays throughout the year are the same. The overlapping of annual data allows to compare Monday to Monday, this is important due to the weekly settings of the heating ventilation and air condition system scheduling.

The term "percent change" represents the degree of change over a period of time.

The term "processor" refers the electronic circuitry within a computer that carries out the instructions of a computer program by performing the basic arithmetic, logic, controlling and input/output (I/O) operations specified by the instructions.

The term "quartile" refers to each of four equal groups into which a population can be divided according to the distribution of values of the energy data. Quartile filtering removes outliers such as holidays and blackouts, from the last 5 same weekday days.

The phrase "resample interval energy data and interval temperature data to one day periods" refers to a method of frequency conversion by frequency of time, such as an initial sampling of every 15 minutes, then resampling to every hour.

The term "script" refers to a program or set of instruction that tells a computer to do something The term "server" refers to a type of computer or device on a network that manages network resources. The server provides requested HTML pages for the client, in addition to providing the program logic for the invention.

The term "smart meter" refers to a device that measures interval energy data and transmits the interval energy data to an energy portal by smart meter identification number and by structure defined by an address. Such as the Smart Meter manufactured by Itron, OpenWay model.

The term "structures defined by an address" refers to one or more structures such as a high rise, a house, a warehouse, a school, a parking lot, industrial facility, a bus stop with electronic signs, an airport, or a waste treatment facility.

The term "threshold values" refers to a value defined by a user to cause an alert report to be transmitted to a client device.

The term "utility companies" refers to power distribution companies, for example CenterPoint Energy.

The term "weather stations portals" refers to an airport website or local weather station that provides interval temperature data via the internet.

The Term "weekday" it is used to refer when comparing Monday to Monday, or Tuesday to Tuesday.

Turning now to the Figures, FIG. 1 shows weather related energy information system 100 that is implemented by the unique method.

The system uses a server 110 with processor and computer readable media connected electronically to a network 120.

The server with processor and network can connect to pre-existing weather stations portals 130a and 130b and preexisting energy portals 140a and 140b. The energy portals 140a and 140b are maintained by utility companies 112. The processor and network connect to preexisting smart meters that are electronically connected to each physical structure having and address.

Weather station portals can be at airports 133 proximate the structures defined by an address, such as within 60 to 100 miles of the structure defined by the address. Weather station portals 130a and 130b can be a weather station 134, proximate the structures defined by an address.

The server and network can be connected to a plurality of smart meters 150a-150e at least one meter is for each physical structure with an address.

Each smart meter is mounted to or proximate structures defined by an address 199a-199e. Structure defined by an address 199a is a warehouse, structure defined by an address 199b is an office building, structure defined by an address 199c is a hospital, structure defined by an address 199d is a convenience store, and structure defined by an address 199e is a residential house.

At least one client device 160 can be connected to the network 120 for viewing at least two interactive graphs generated by the server 110 using conditioned harvested data collected by the server 110 from the smart meters 150a-150e.

The server 110 with processor can be configured to crawl through the energy portals and temperature portals and harvest energy interval and temperature interval data either identified by a structure defined by an address forming harvested energy interval and temperature interval data.

The server 110 with processor uses the dynamic energy model to condition the harvested energy interval and temperature interval data. The conditioning can include cleaning; indexing and slicing the harvested energy interval and temperature interval data forming conditioned harvested data.

The server 110 with processor uses the dynamic energy model to generates groups of interactive graphs using the conditioned harvested data and presents it to the client device 160, using an interface 165.

The server 110 with processor uses the dynamic energy model to compare stored threshold values stored in non-transitory computer readable medium of the server connected to the processor and automatically generates alert reports 243 and daily 244 reports to the client device.

FIGS. 2A-2E shows the server 110 with a processor 111 and a non-transitory computer readable medium 113 in communication with a network 120.

The non-transitory computer readable medium 113 of the server 110 stores energy metrics 231 for each physical structure defined by an address 199 in the dynamic energy model.

In embodiments, the server 110 with a non-transitory computer readable medium 113 has instructions 300, which when executed by a processor, crawling through the energy portals and temperature portals and harvests energy interval data and temperature interval data for the physical structure defined by an address 199 forming harvested energy interval and temperature interval data 221 that is stored in the non-transitory computer readable medium 113 and namely in the Dynamic energy model.

The server 110 with processor and a non-transitory computer readable medium 113 has instructions 302, which form the dynamic energy model, which when executed by a processor, performs steps to condition harvested energy interval and temperature interval data 221 forming conditioned harvested data 226, wherein the conditioning includes cleaning, indexing and slicing. The conditioned harvested data 226 is stored in the non-transitory computer readable medium 113 in the dynamic energy model.

The server with processor and a non-transitory computer readable medium 113 has instructions 304 in the dynamic energy model, which when executed by a processor, generate groups of interactive graphs 170a using the conditioned harvested data 226 for each physical structure defined by and address 199 and transmits the interactive graphs to one or more client devices. Each client device displays the interactive graphs 170a on a user interface 165.

In embodiments, the server 110 with processor and with a non-transitory computer readable medium 113 has instructions 306 in the dynamic energy model, which when executed by a processor, store threshold values 240 and energy metrics 23 for each physical structure defined by an address 199 in the non-transitory computer readable medium 113.

The dynamic energy model is identified as element 430.

The dynamic energy model 430 contains instructions 308, which when executed by a processor, perform a series of steps to populate the energy metrics for the last day of an interval 432, the last six days of an interval 434, and the last thirty five days of an interval 436.

The dynamic energy model 430 contains instructions 310, which when executed by a processor, perform a statistical modeling utilizing first and third quartile filtering 269 to remove outliers such as holidays and blackouts, from the last five same weekday days.

The dynamic energy model 430 contains instructions 312, which when executed by a processor, determine percent changes in energy metrics 231 as of the last day of an interval 432, the last six days of an interval 434, and last 35 days of an interval, comparing the percent change to stored threshold values 240 in the non-transitory computer readable medium 113, and if the percent change does not exceed the stored threshold value 240, automatically generating a daily report 244 and optionally an alert report 243.

In embodiments, the server using the dynamic energy model to compute a plurality of variables like maximum energy usage days 245 and minimum energy usage days 246 which are stored in the non-transitory computer readable medium and inserted into the daily report 244.

In embodiments, the server with processor sets a start time 211 which is stored in non-transitory computer readable medium 113 and the dynamic energy model to harvest energy interval and temperature interval data from the smart meters connected to the network. The server is set to perform the harvesting on 15 minutes intervals continuously in an embodiment of the method.

The server can also identify a quantity of physical structures defined by an address to be monitored and generate a counter 217.

The server 110 with processor can increase the counter by one unit (N+1) to go to a next physical structure defined by an address 199 and determine if the value of N of the counter has become bigger than a total preset unit (t) of structures defined by an address 257. The server 110 ends the analysis, or if the value of N of the counter is less than a total preset unit (t) of structures defined by an address 257, the server 110 with processor uses the dynamic energy model to automatically harvest interval energy data and interval temperature data for that next structure defined by an address 199. The server continues comparing the quantity of structures defined by an address to the counter and continues harvesting interval energy data and interval temperature data until the value of N reaches the value of (t+1).

The server with processor gathers user information 261 on users and physical attributes of structures defined by an address and stores the user information in memory and in the dynamic energy model.

In an embodiment, the server with processor uses the dynamic energy model to generate a dictionary 267 for energy metrics by assigning values to variables.

Figure 2A:
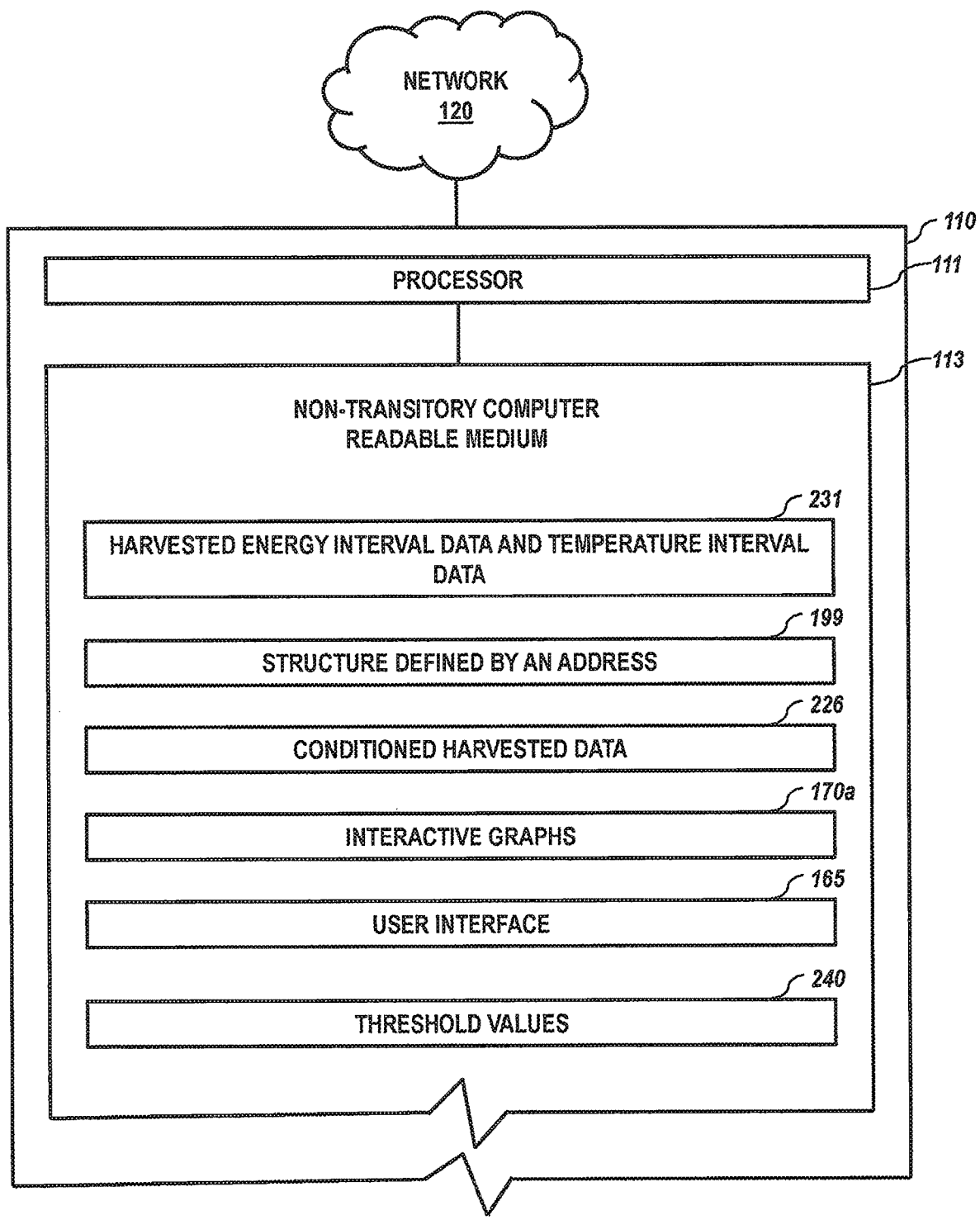
Figure 2B:
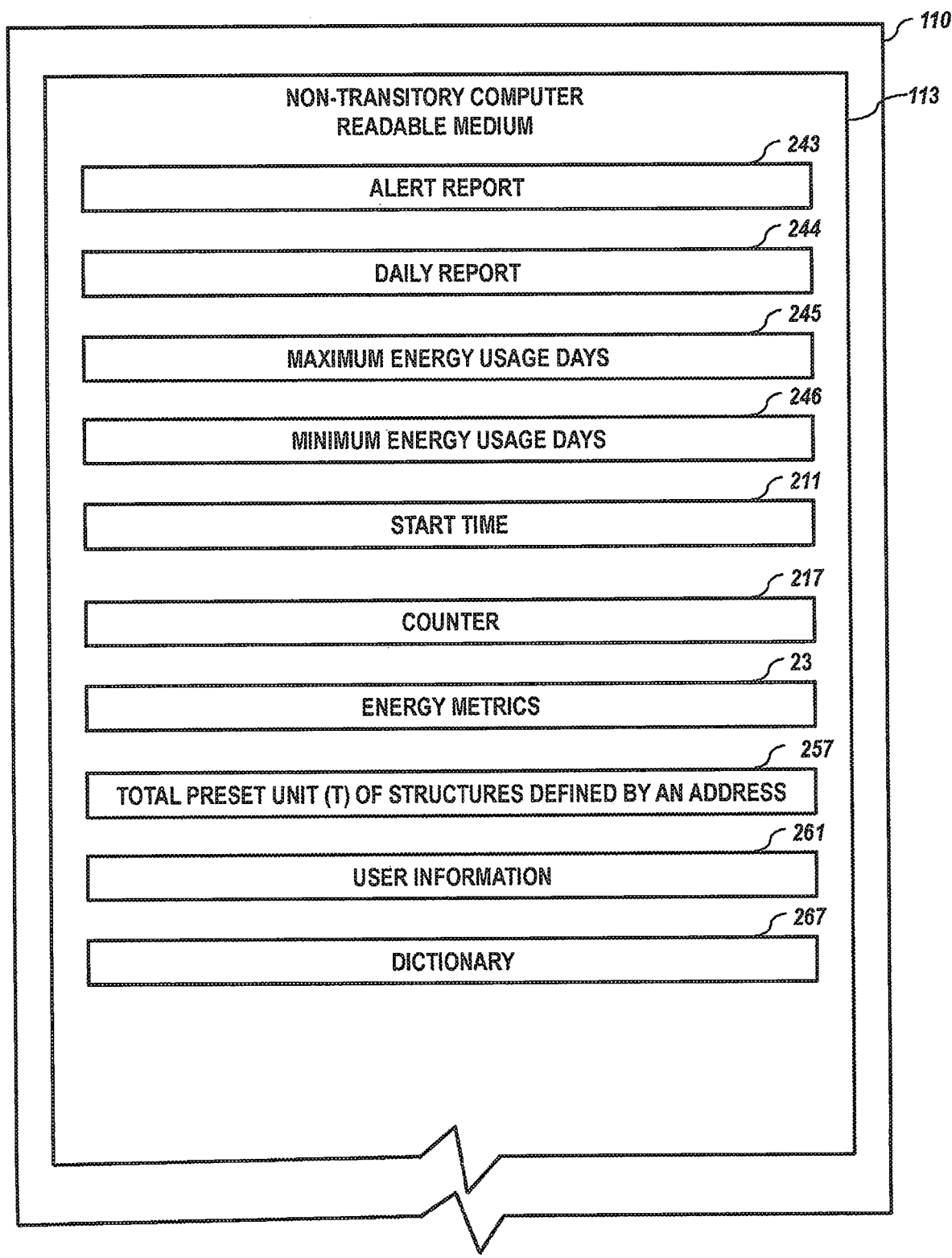
Figure 2C:
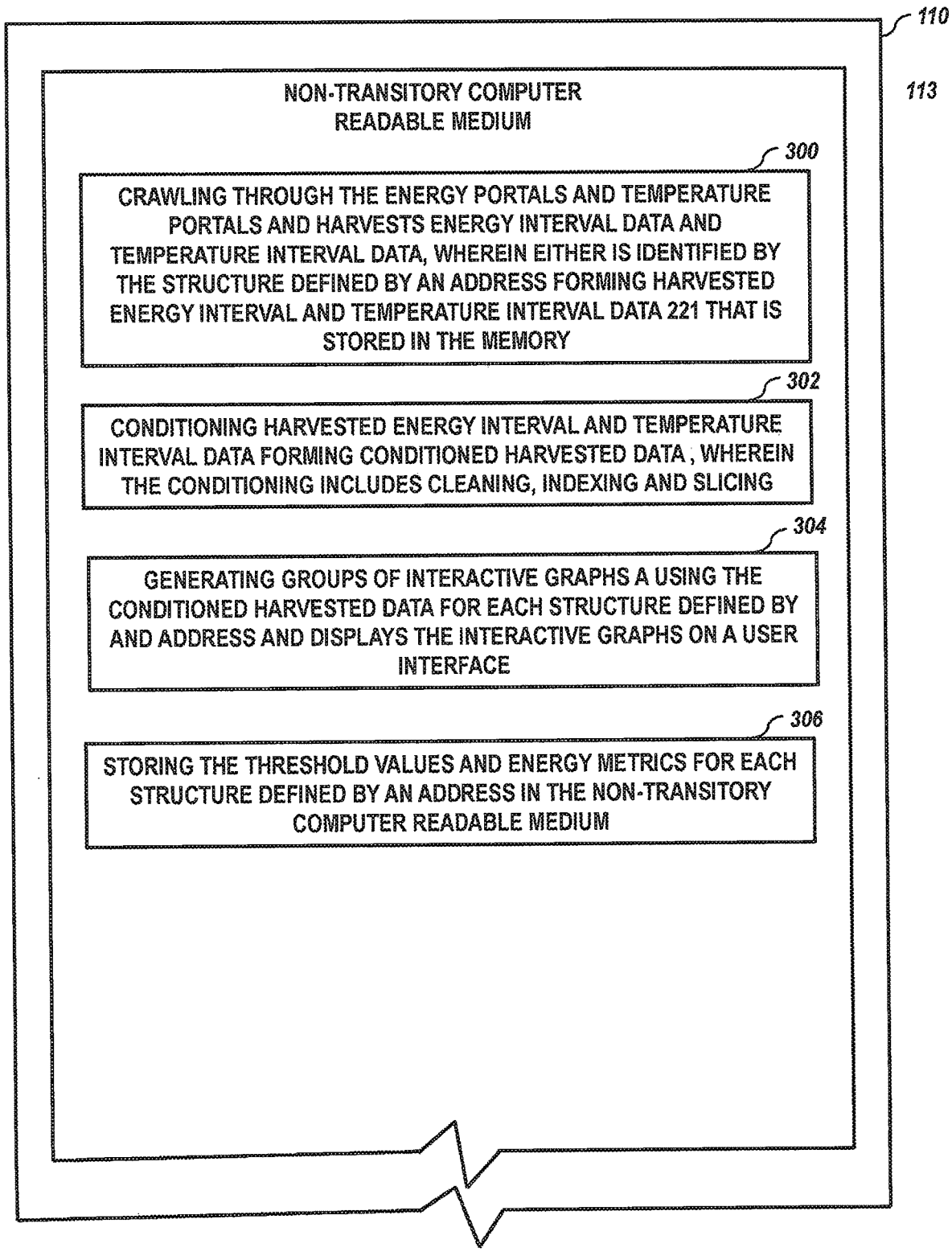
Figure 2D:
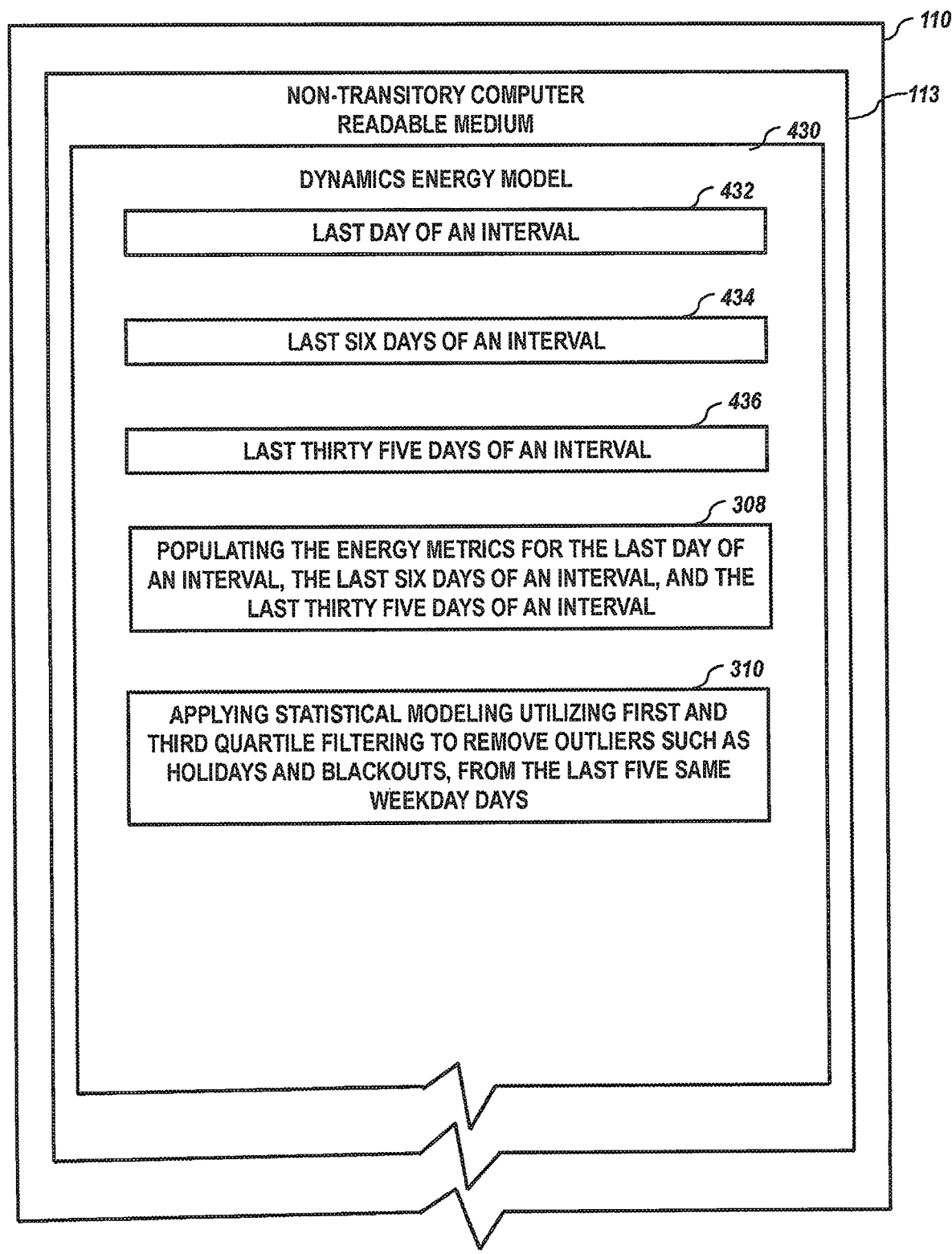
Figure 2E:
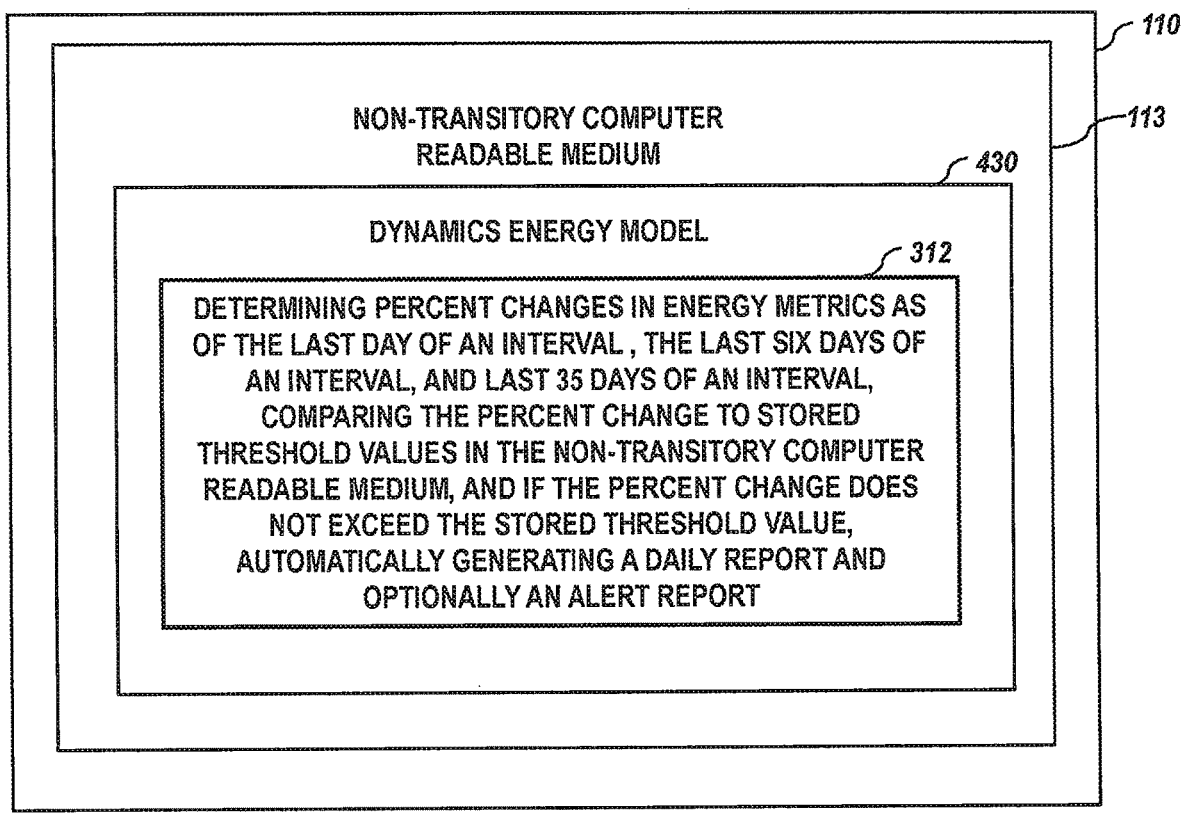
Figure 3A:
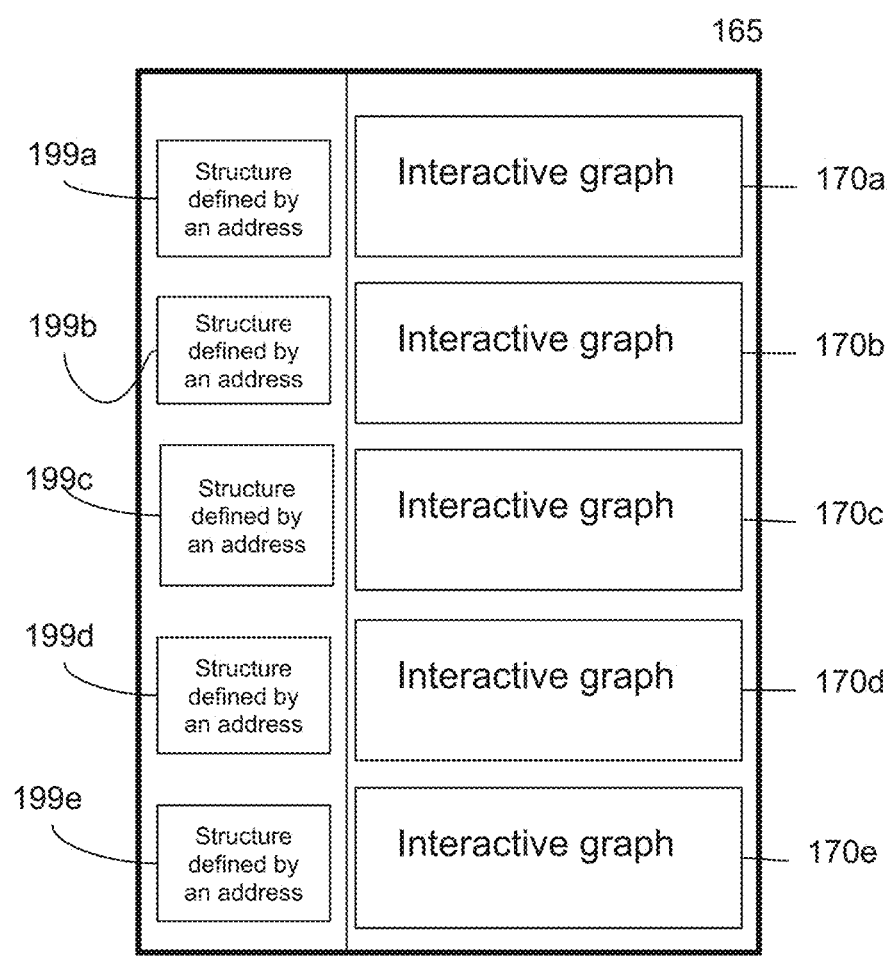

FIG. 3A illustrates the interface 165 where the interactive graphs 170a-170e generated by the dynamic energy model are presented to a client device 160, in the left side the list of physical structures defined by an address 199a-199e.

Figure 3B:
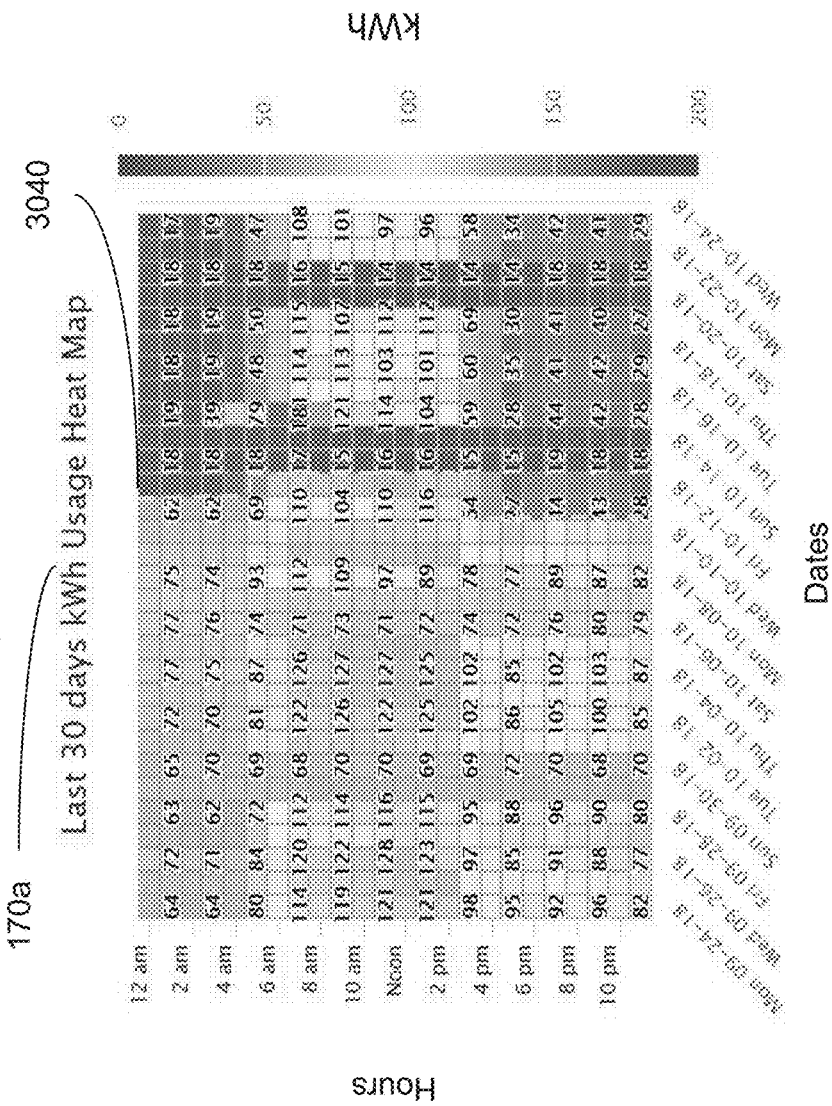

FIG. 3B illustrates an interactive graph 170a showing 30 day kWh heat map for a structure defined by an address 199a generated by the dynamic energy model. The x-axis shows 30 calendar days. The y-axis shows the used energy in kWh per 24 hours per day. The right side shows a color scale, wherein the lowest kWh are represented in blue, the low mid rage kWh are represented in yellow, the high mid-range kWh are represented as orange, and the high kWh are represented in red for the structure defined by an address 199a.

Figure 3C:
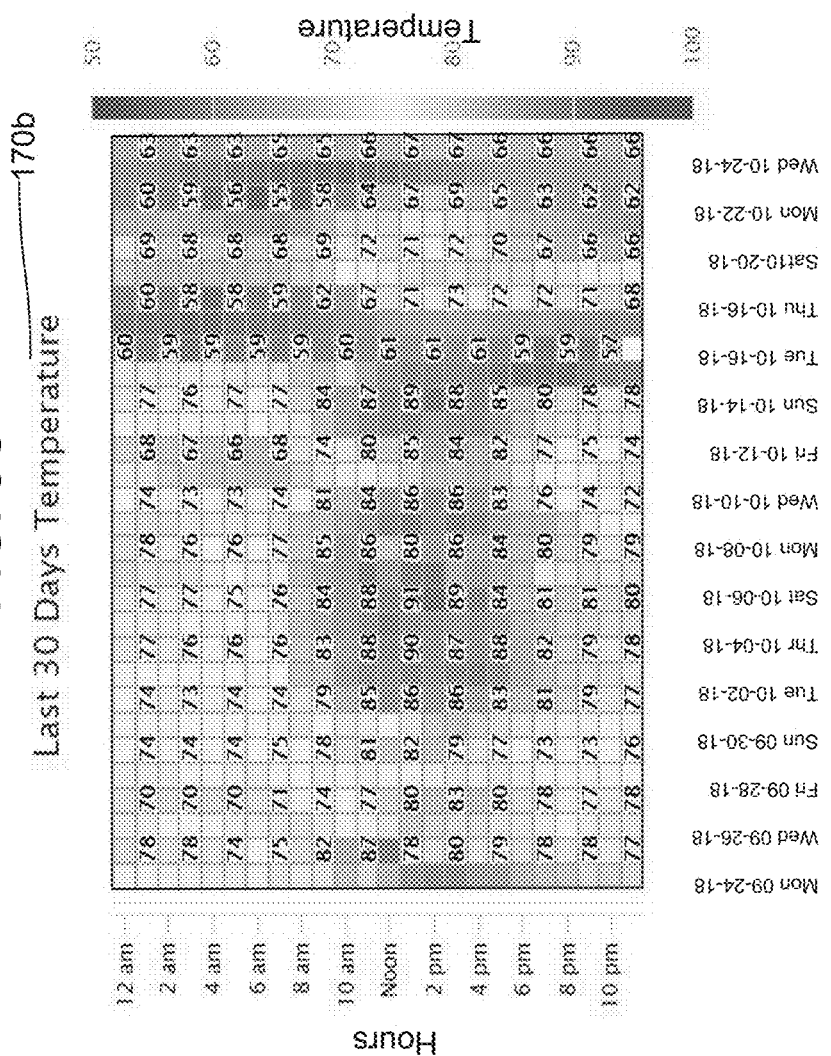

FIG. 3C shows an interactive graph 170b showing 30 day temperature heat map for a structure defined by an address 199a generated by the dynamic energy model. The x-axis shows 30 calendar days. The y-axis shows the used energy in temperature per 24 hours per day. The right side shows a color scale, wherein the lowest temperature is represented in blue, the low mid rage temperature is represented in yellow, the high mid-range temperature is represented as orange, and the high temperature is represented in red for the structure defined by an address 199a.

FIG. 3D shows an interactive graph 170c for the total kWh aggregated monthly usage for a structure defined by an address 199a generated by the dynamic energy model. The FIG. 3D depicts all the data available in the system. In this instance, the energy consumption data for the past 3 years is shown. Note that the interactive graph can be displayed in 15 minute intervals, days, weeks, months, and years.

FIG. 3E shows the 15 interval kWh usage data yearly overlaid by the dynamic energy model.

The FIG. 3E interval energy consumption data is overlaid year over year for a physical structure defined by an address 199a. The green line depicted energy consumption for 2018 first weeks of April and the black line depicts 2017 energy consumption. FIG. 3E, Illustrates the comparative line-graph of energy usage between 2018 green color and 2017 black color, showing in the X axis the period from 20-August April-8 to 10-September April-20 calendar days and in the Y axis the used energy in kWh; we can see an excess of energy usage in the baseload.

FIG. 3F illustrates an interactive graph showing yearly kWh heat map for a school for the structure defined by an address 199a generated by the dynamic energy model. In this instance, a calendar year of energy usage is shown. The X axis shows the 12 months in calendar days and the Y axis shows the used energy in kWh per 24 hours per day. The heat map graph shows per hour the value-related color associated with the scale below from 0 to 200 kWh for a structure defined by an address 199a.

FIG. 4A depicts the outline of the daily report 244 containing data 253a-253d and charts 251a-251i and the alert report containing alert data 252 and data 253e-253g and charts 251j-251r generated by the dynamic energy model.

FIG. 4B illustrates the top bar-chart 251j, which is a comparative chart where the x-axis is the day and y-axis is energy usage in kWh showing total daily energy usage the current weekday and the same weekday of last year generated by the dynamic energy model. Blue is the daily energy usage for the current year and gray is the energy usage for the previous year same weekday. In this case the usage of Tuesday, Aug. 21, 2018 was 2,492 kWh, and for the same Tuesday of 2017, the usage was 1,958 kWh. The bottom bar chart, sharing the same x-axis depicts the percent difference in usage, showing an excess, color coded to red. In this case the percent difference of 27%, exceeds the threshold of 10% triggering an alert report.

FIG. 4C illustrates the line chart 251k of an alert report 243. This section of the alert report provides a 15 minutes interval kWh line-chart generated by the dynamic energy model. The x-axis is 24 hours of a day, and y-axis contains kWh (blue line), percent change (green line) and temperature (red line). The highest electrical usage or peak for the day was 34.27 kWh at 2:00 pm, the lowest electrical usage was 18.61 kWh at 02:15 am, and the average electrical usage was 25.96 kWh for the day. The max percent change in electrical usage of 0.16 at 5:45 am and lowest of −0.01 at 11:45 pm. One can infer the start and shutdown of HVAC by the relatively high and low percent changes in kWh usage.

FIG. 4D illustrates a two line-chart 251l generated by the dynamic energy model. The first chart compares the Tuesday, Aug. 21, 2018 energy usage at 15 interval kWh against the previous year same weekday. The x-axis shows 24 hours of a day, and y-axis shows kWh. Red shaded areas show greater kWh usage as compared to the previous year with the same weekday. Green areas show less kWh. Higher usage is shown from 12:00 am to 6:00 am, from 9:30 am to 10:00 am, from 12:00 pm to 12:30 pm, from 2:00 pm to 3:00 pm, and form 3:00 pm to 12:00 am for the day of Tuesday Aug. 21, 2018. Similarly the bottom chart 251l depicts the temperature interval data for Tuesday, Aug. 21, 2018. The chart depicts an overall less temperature average by hour than the same weekday of the previous year.

FIG. 4E illustrates a two bar-charts 251m generated by the dynamic energy model.

The top chart shows a comparative of seven days total daily energy usage against previous year same weekdays. The x-axis is in days, in this case from Wednesday August 15$^{th}$ to Tuesday August 21$^{st}$ and y-axis daily energy usage in kWh, wherein blue color is current year and gray is the previous year. The bottom chart shows on the y-axis the percent difference in kWh for the previous seven days. Red bars depict greater kWh usage as compared to the previous year same weekday, and green areas depict less kWh.

FIG. 4F illustrates two line-charts 251n generated by the dynamic energy model. The top chart shows a comparative of seven day intervals energy usage against the previous year same weekdays. In this instance, the x-axis seven represents days from Wednesday August 15$^{th}$ to Tuesday August 21$^{st}$, and y-axis represents daily energy usage in kWh. Red shaded areas show greater kWh usage as compared to previous year same weekday, and green areas show less kWh. Usage is higher for Monday August 20$^{th}$ through Tuesday August 21$^{st}$ as compared to the previous year same weekday 2000 and 2100. The bottom line chart depicts temperature on the y-axis for the previous seven days. The line chart shows a lower average temperature between Wednesday August 15$^{th}$ to Sunday August 18$^{th}$.

FIG. 4G illustrates a heat map 2510 with daily total energy usage in kWh for the last 35 days for a physical structure generated by the dynamic energy model. On the x-axis is the weekdays and on the y-axis is Days. Each square in the heat map represents the total daily kWh. The heat map 2510 colors are related to the scale on the right side scale. Low values are depicted in blue, high values in red, middle range values in yellow. In this instance, the facility operates weekly with weekend off, which can be observed in the heat map 251o. Tuesday Aug. 20, 2018 shows 2,492 kWh. The energy model calculates a percent change of 73.85% compared to the average of the last five Tuesdays, which cross the threshold of 10%. This section of the report provides daily energy usage data of the month up to the current date of the report with the total usage of 27,177 kWh.

FIG. 4H illustrates a heat map 251p with daily degree-hours for the last 35 days. The x-axis represents the weekdays, and the y-axis represents days generated by the dynamic energy model. Each square in the heat map represents the total daily degree hours. The heat map colors are related to the scale on the right side scale. Low values are depicted in blue. High values are depicted in red. Middle range values are depicted in yellow. Degree-hours are calculated using 65 Fahrenheit degrees as base temperature per every hour of a day.

FIG. 4I illustrates a heat map 251q with daily total energy usage in kWh/DH for the last 35 days generated by the dynamic energy model. On the x-axis are the weekdays and on the y-axis is Days. Each square in the heat map represents the total daily kWh/DH. The heat map colors are related to the scale on the right side scale. Low values are depicted blue, high values in red, middle range values in yellow. For Tuesday Aug. 20, 2018 the kWh/DH was 96. The energy model calculated a percent change of 10.67% compared to the average of the last five Tuesdays, which cross the threshold of 10% triggering an alert report.

FIG. 4J, illustrates a heat map 251r with daily total energy usage in kWh/DH/SqFt for the last 35 days generated by the dynamic energy model. On the x-axis are the weekdays and on the y-axis are Days. Each square in the heat map represents the total daily kWh/DH/SqFt. The heat map colors are related to the scale on the right side scale. Low values are depicted blue, high values in red, middle range values in yellow.

FIG. 4K, illustrates the data section 252 of the Alert Report issued for the structure at 19350 Rebel Yell Dr. for the day of Tuesday, 21, 2018 generated by the dynamic energy model.

FIG. 5 a graph showing another portion of a daily report from the Dynamic energy model 430 that performs the steps of: calculating energy metrics for each structure defined by an address for: a last day of conditioned harvested data, a last six days of conditioned harvested data, and a last thirty five days of conditioned harvested data; determining percent changes in energy metrics for each structure defined by an address for: a last day of conditioned harvested data, a last six days of conditioned harvested data 226, and a last thirty five days of conditioned harvested data; and comparing the percent change to stored threshold values and if the percent change does not exceed the stored threshold values automatically, generate a daily report 244 and optionally generate an alert report 243 to the client device for each structure defined by an address.

The Dynamic energy model presents a heat map that depicts mean energy use for six days having same weekday 619a-e, shown as Friday in this figure, during thirty five consecutive days.

In embodiments, the processor of the server crawls through energy portals and temperature portals and harvests energy interval and temperature interval data by physical structure defined by an address including weather data from airports 133 or a weather station 134 within from 60 miles to 100 miles of the structure defined an address as shown in FIG. 1.

In embodiments, the method can generate an alert report that defines each threshold value exceeded and a percent change in energy usage for each structure defined by an address.

In embodiments, the cooling and heating degrees hours can be stored in the dynamic energy model.

In embodiments, the server with processor can resample interval energy data and interval temperature data in 24 hour intervals and use the dynamic energy model to create a daily report for each physical structure with an address.

In embodiments, the server with processor uses the dynamic energy model to present conditioned harvested data by multiple individual dates in the daily report.

In embodiments, the dynamic energy model instruct the processor to harvest the interval energy data occurs every 15 minutes or less and the harvesting of the interval temperature data occurs every five minutes or less.

In embodiments, the method can use a standard base temperature of 60 degrees Fahrenheit and temperature interval data of every 15 minutes to determine degree values.

In embodiments, the processor with dynamic energy model can generate sets of historical monthly energy heat maps that enable visualization of a last 30 days for energy usage by hour per day with a color dependent value related to a color pallet.

The method can provide monthly historical heat maps to identify patterns anomalies and identify opportunities of energy conservation.

In embodiments, the method creates maps and can resample energy interval data to comparable days of a week and overlapping annual data sets to compare a current year versus previous years, by month, by day, and by hour.

In embodiments, the method contemplates the processor with dynamic energy model can calculate changes in energy metrics and mapping changes in energy metrics to show startup and shutdown times of equipment using energy in a structure defined by an address.

Example 1

The invention relates to a method that uses an administrative server with a processor and non-transitory computer readable medium that connects to the Internet containing the dynamic energy model.

A physical structure defined by an address 199a, such as a school district with 100 properties in Houston, Tex. requests to have the method determine automatically energy usage and cross correlate to weather information. FIG. 3A depicts the structure defined by an address 199a. From the user interface 165, the client 160 can view in details all interactive graphs for the 100 properties.

The school district will utilize the energy portals and temperature portals, such as IAH George Bush Intercontinental Airport weather stations portal and Centerpoint energy portals. In FIG. 3C, the figure illustrates the heat map of the airport and can get a sense of the temperature patterns for the last 30 days.

Each school building has a smart meter mounted to it and in communication with the Internet.

A computer is connected to the network for viewing at least two interactive graphs namely, a 30 day heat map FIG. 3B and a yearly heat map FIG. 3F using conditioned harvested data produced by the administrative server for each school building of the 100 properties.

The server with processor uses the dynamic energy model to crawl through the energy portal of Centerpoint and the temperature portal of the airport and harvests energy interval data and temperature interval data by the structure defined by an address.

The server with processor saves the harvested information in the dynamic energy model that has a database in the non-transitory computer readable medium connected to the administrative processor forming harvested energy interval and temperature interval data.

Using instructions in the dynamic energy model stored in the non-transitory computer readable medium of the administrative server, the processor conditions harvested energy interval and temperature interval data forming conditioned harvested data.

Using templates stored in the dynamic energy model, the processor generates groups of interactive graphs namely a 30 day heat map FIG. 3B from September 24 to Oct. 24, 2018 and FIG. 3C using the conditioned harvested data. In addition the client can also notice that reduction in energy consumption on Wednesday Oct. 10, 2018, which may indicate a correction in energy usage, 3040.

The dynamic energy model uses the server with processor to store threshold values of kilowatt degree days inserted by an agent of the school district and the server generates alert reports using those inserted threshold values.

The dynamic energy model provides with server with processor a script for generating energy metrics for each structure defined by an address, such ALC West 19350 Rebel Yell Dr, Houston, Tex. 77019.

The server uses a dynamic energy model stored in non-transitory computer readable medium with the conditioned harvested data ti performs the steps of: calculating energy metrics for each physical structure defined by an address in the school district for a last day of conditioned harvested data, a last six days of conditioned harvested data, and a last thirty five days of conditioned harvested data.

The server uses the dynamic energy model stored in non-transitory computer readable medium with the conditioned harvested data to determine percent changes in energy metrics for each structure defined by an address for: a last day of conditioned harvested data.

The server uses the dynamic energy model stored in non-transitory computer readable medium with the conditioned harvested data to compare the percent change to stored threshold values and if the percent change does not exceed the stored threshold values automatically generate a daily report 244 and optionally generate an alert report to the client device for each structure defined by an address.

FIG. 4A depicts the alert report outline and FIGS. 4B-4M illustrate the Alert Report for the day of Tuesday 21, 2018 for the property defined by an address 19350 Rebel Yell Dr.

This particular report was an alert report generated by the dynamic energy model because energy metrics values exceeded a preset threshold tored in the dynamic energy model.

FIG. 4B illustrates the data analysis performed by the systems and threshold exceeded. Percent change kWh set at 15% and the percent change for Tuesday 21, 2018 was 27% thus triggering the Alert report. In FIG. 4B, the daily report 251*j* illustrates in a bar chart the percent change in kWh.

From FIG. 4C, the daily report 251*k* depicts the interval kWh data for Tuesday Aug. 21, 2018 and the temperature the interval data for the same day, sharing x-axis.

FIG. 4D depicts the areas when the property used more electricity than the same weekday previous year, color coded in red 4200, 4220, 4230, 4240, and 4250. Moreover form FIG. 4E 251*m* in the alert report the client is able to notice that the property had a 205 percent usage on Sunday Aug. 19, 2018.

As a result of viewing the generated interactive maps with alert report the customer, an energy manager, for the Independent School District, noticed that the equipment at the property was actually left on.

Example 2

The invention relates to a weather related energy information method that uses an administrative server with a processor and non-transitory computer readable medium that connects to the Internet.

A physical structure defined by an address 199*a*, such as property management with 1 property in Houston, Tex., requests to have the service and use the dynamic energy model.

FIG. 3A depicts the properties 199*a-e*, as shown in the invention interface. From the User interface 165 the customer/client device 160 can view in details all interactive graphs for 800 Wilcrest Dr, Houston Tex. 77042 property.

The property management will utilize energy portals and temperature portals, such as the Sugar Land Regional Airport weather stations portal and Centerpoint energy portals. Illustrated in FIG. 6B, the figure illustrates the heat map of the airport and can get a sense of the temperature patterns for the last 30 days. 6010 the client can notice a weather cold front started on about Monday Oct. 15, 2018, at around 10:00 am. This information allows the client to lower the start time of their HVAC in order to take advantage of the cooler weather.

The office building has a smart meter mounted to it and in communication with the Internet.

Figure 6A:
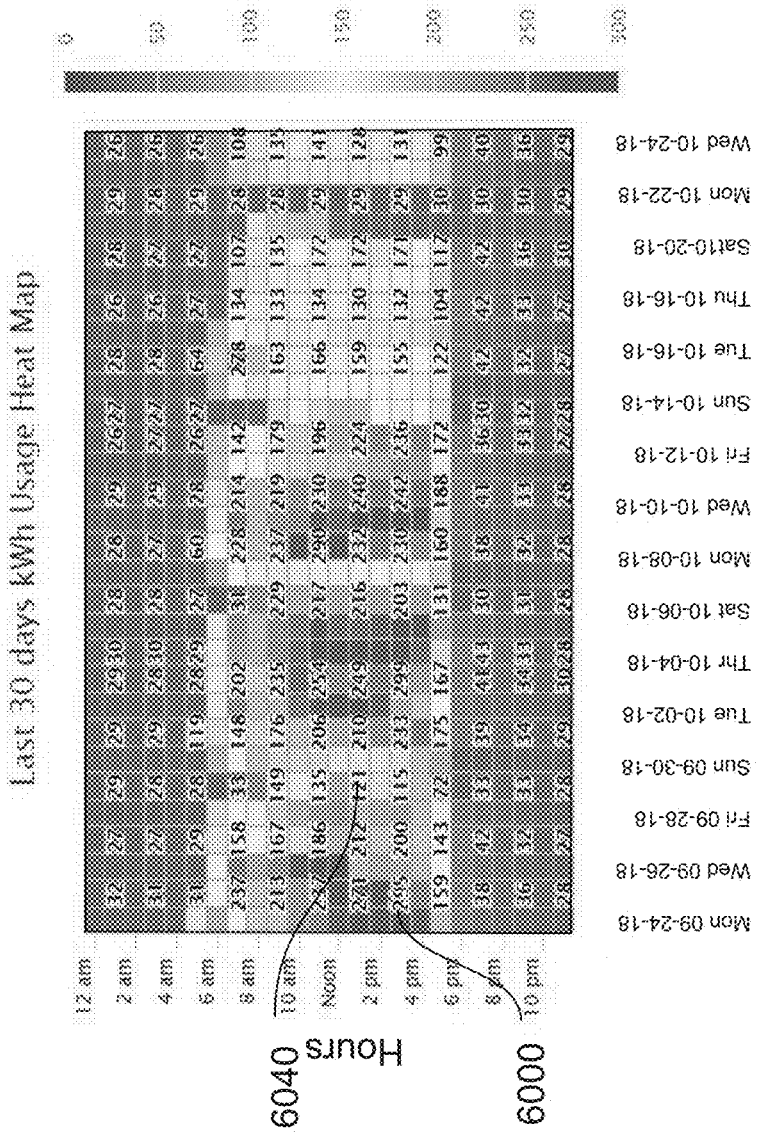

A computer is connected to the network for viewing at least two interactive graphs namely 170*a* and 170*b*, a 30 day kWh heat map in FIG. 6A and a total interval kWh line graph for the office building at 800 Wilcrest Dr. using conditioned harvested data produced by the administrative server.

The server with processor uses the dynamic energy model to crawl through the energy portal of Centerpoint and the temperature portal of the airport and harvests energy interval data and temperature interval data by the structure defined by an address.

The server uses the dynamic energy model to save the harvested information in a dynamic database of the dynamic energy model in the non-transitory computer readable medium connected to the administrative processor forming harvested energy interval and temperature interval data.

Using instruction in the dynamic energy model in the non-transitory computer readable medium of the administrative server, the processor conditions harvested energy interval and temperature interval data forming conditioned harvested data.

Using templates stored in memory and the dynamic energy model, the processor generates groups of interactive graphs.

FIG. 6A depicts the interactive graphs 170a-170e that the client 160 is able to view via the system user interface 165. The interactive graph 170a in FIG. 6A is the past 30 days heap map of kWh consumption by hour by day and color-coded for higher consumption, red, and lower kWh consumption blue. Max kWh for the past 30-day is about 318 kWh on Monday Sep. 15, 2018, 6000. 6040 also depicts Sunday Sep. 30, 2018, when the HVAC was turned on in this specific case a Tenant at the building requested after hours HVAC services. The intentioned further helped by reminding client to charge for the afterhours HVAC as administration had forgotten to enter the Tenants request in their accounting system.

Figure 6B:
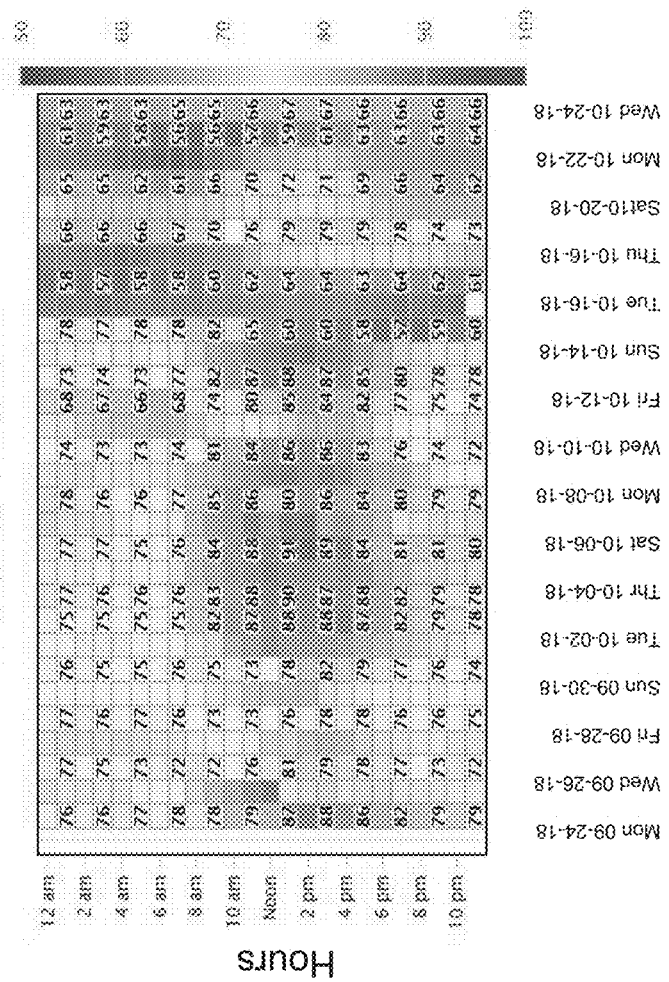

FIG. 6B, charts 170b depicts the last 30 days temperature of the airport weather portal 133. 170b FIG. 6B shows the max temp for the past 30 days as 100 and the lowest at around 50 degrees Fahrenheit. With the coldest day or a cold front starting at around 10 am Monday Oct. 15, 2018, the 30 days temperature graphs allows the property management to set their heating ventilation and air conditioning setting a bit higher in order to take into account the temperature decrease. For example if the heating ventilation and air conditioning system set point for cooling was set at 50 degrees it is time be able to increase the temperature to 55 or 60 degrees to take advantage of the weather, it also allows property management company to review the building's performance and check if there if the building is actually reducing the consumption of energy due to the reduction in demand for energy due to temperature.

FIG. 6C, chart s170c is the total interval kWh graphs for 800 Wilcrest the graph shows the kWh interval data from 2015 to October 2018.

Figure 6D:
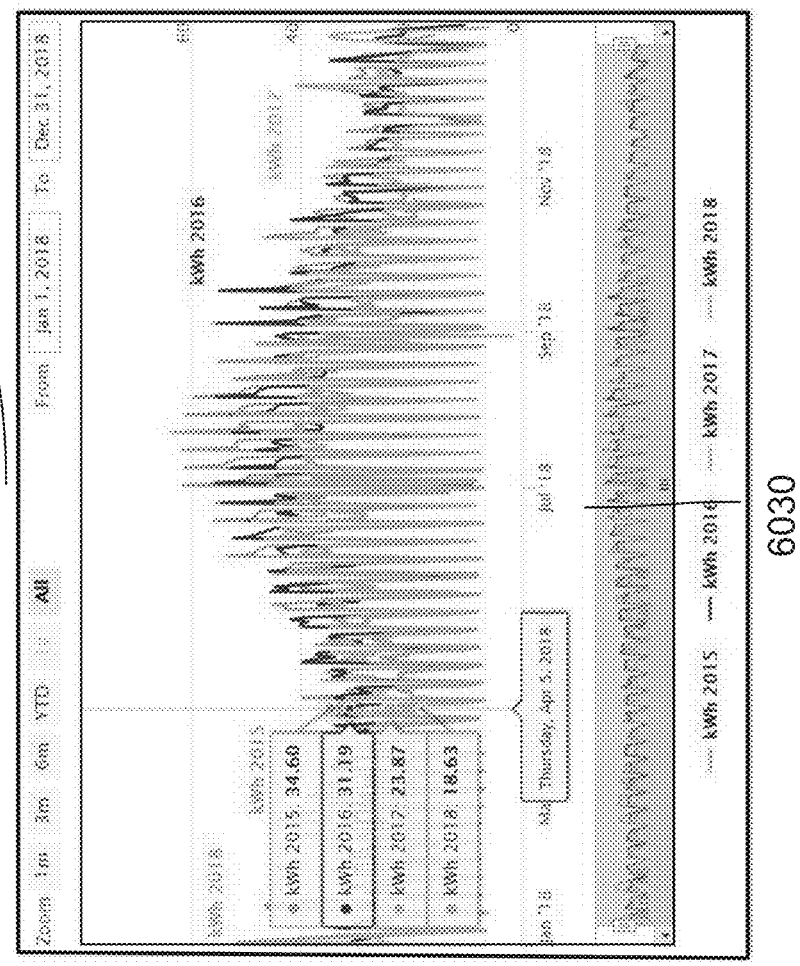

FIG. 6D charts 170d shows the yearly overlaid of interval kWh. The year 2018 is in orange, which by comparison has the lowest consumption except 6030 for a couple of peaks during the month of January 6020.

Figure 6E:
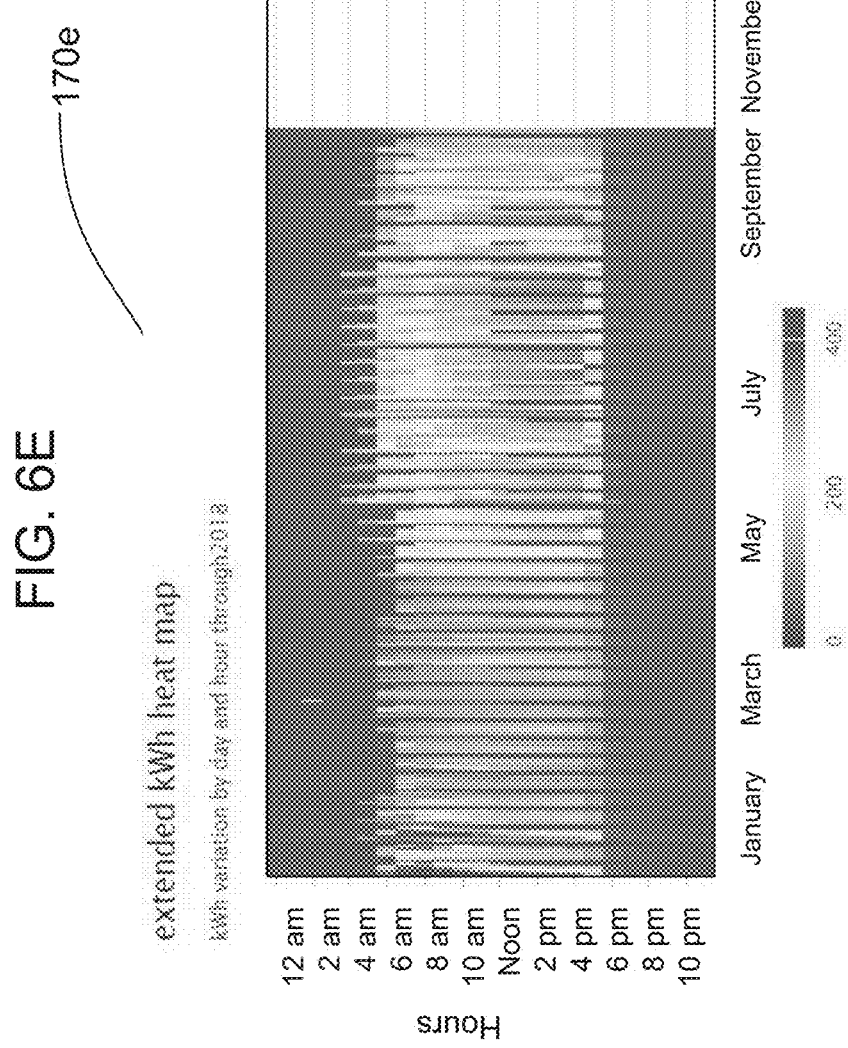

FIG. 6E charts 170e shows historical heap map by day and hour for 2018 to present.

Overall, the lower energy consumption in blue shows optimal conservation when no units were left on during afterhours or weekends. Except for Sep. 30, 2018 6040 and a couple of more days. These events turn out to be the weekend request for AC.

The server with processor stores threshold values of kilowatt degree days inserted by an agent of the property management ion the dynamic energy model and the server generate alert reports using those inserted threshold values.

The server with processor uses a script in the dynamic energy model for generating energy metrics for each physical structure defined by an address, such as 800 Wilcrest Dr, Houston Tex. 77042.

The server with processor uses the dynamic energy model stored in non-transitory computer readable medium with the conditioned harvested data to performs the steps of: calculating energy metrics for each structure defined by an address in the property management for a last day of conditioned harvested data, a last six days of conditioned harvested data, and a last thirty five days of conditioned harvested data.

The server with processor uses the dynamic energy model stored in non-transitory computer readable medium with the conditioned harvested data to determine percent changes in energy metrics for each structure defined by an address for: a last day of conditioned harvested data.

The server with processor uses the dynamic energy model stored in non-transitory computer readable medium with the conditioned harvested data to compare the percent change to stored threshold values and if the percent change does not exceed the stored threshold values automatically generate a daily report 244 and optionally generate an alert report to the client device for each structure defined by an address. FIG. 4A depicts the alert report outline and FIG. 6F-I illustrate the alert report graphs for the day of Sunday, Sep. 30, 2018 for the property defined by address 800 Wilcrest Dr. Houston, Tex. 77042. This particular report was an alert report due to the energy metrics from the dynamic energy module exceeds the threshold, more specifically a percent change in kWh of 115% and a percent change in kWh/DH of 116%. Percent change kWh set at 10% the percent change for kWh/DH set to 20%, Tuesday 21, 2018 was 115% kWh 6050 change thus triggering the alert report. The kWh/DH threshold was also exceeded at 116%.

In FIG. 6F, chart 251j created with the dynamic energy model illustrates a bar chart energy usage on Sep. 30, 2018 and same weekday previous year, below the percent change in kWh. In this case, we note that the bar is red and positive 115% meaning a percent difference of 115% kWh form the same weekday the previous year.

In FIG. 6G, chart 251k created with the dynamic energy model, shows the linear interval energy data also the temperature and the percent change in the kWh of the interval data from where the system deduces the approximate heating ventilation and air conditioning start time 6060, heating ventilation and air conditioning off time 6070 and peak kWh 6080. The heating ventilation and air conditioning start is approximately 6:00 am 6060, the heating ventilation and air conditioning off time is 5:00 pm 6070, and peak time about 7:00 am 6080.

Figure 6H:
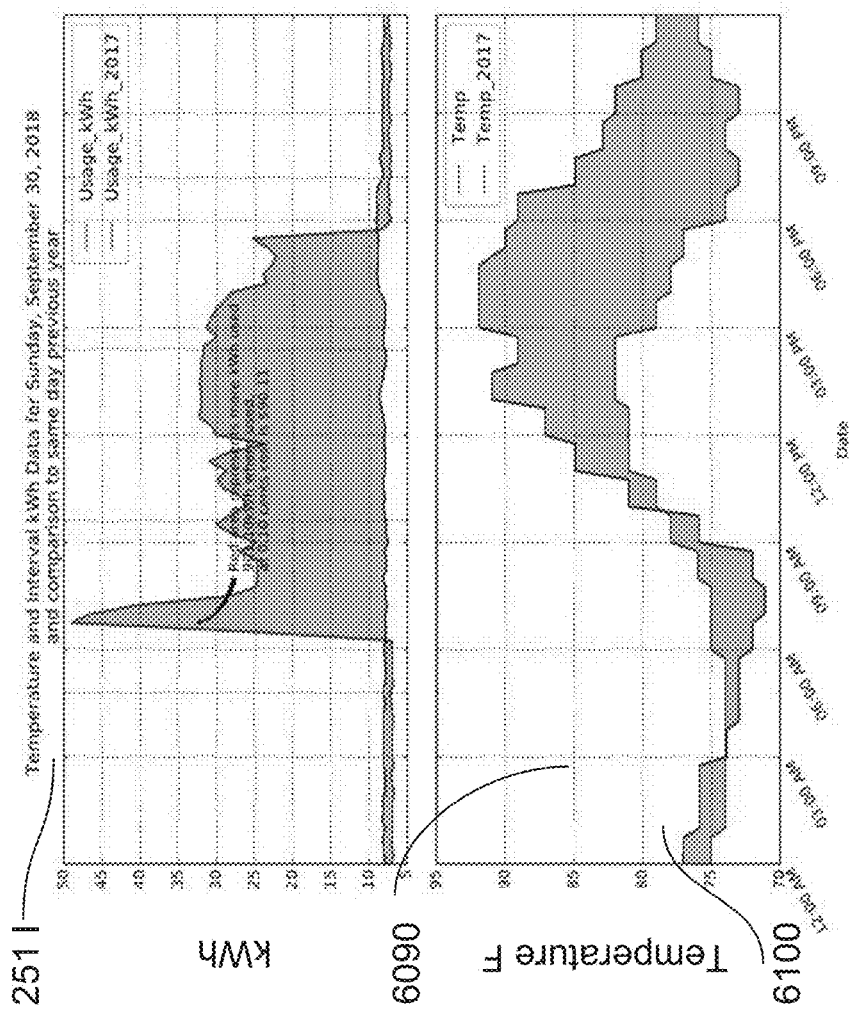

FIG. 6H, chart 251c created with the dynamic energy model shows the overlay of current weekday Sunday, Sep. 30, 2018, of the same weekday Sunday of 2017, by overlapping and subtracting the interval line data graphs shades the less use of energy consumption as a green shaded area and red depicts greater use as compared to last year same weekday.

In FIG. 6H, chart 251c shows that the most of the kWh profile is read indicating the 800 Wilcrest office building used more kWh between 6 am and 5:45 pm but on other times it was green. On this particular day, a Tenant at the building requested for Sunday air conditioning. In the bottom section of the FIG. 6H, chart 251l depicts the interval temperature for the day and compares it to last year, the graph shades less temperature is green and more temperature in green. The graphs provide a graphical way to review the demand due to the temperature between the two days.

Figure 6I:
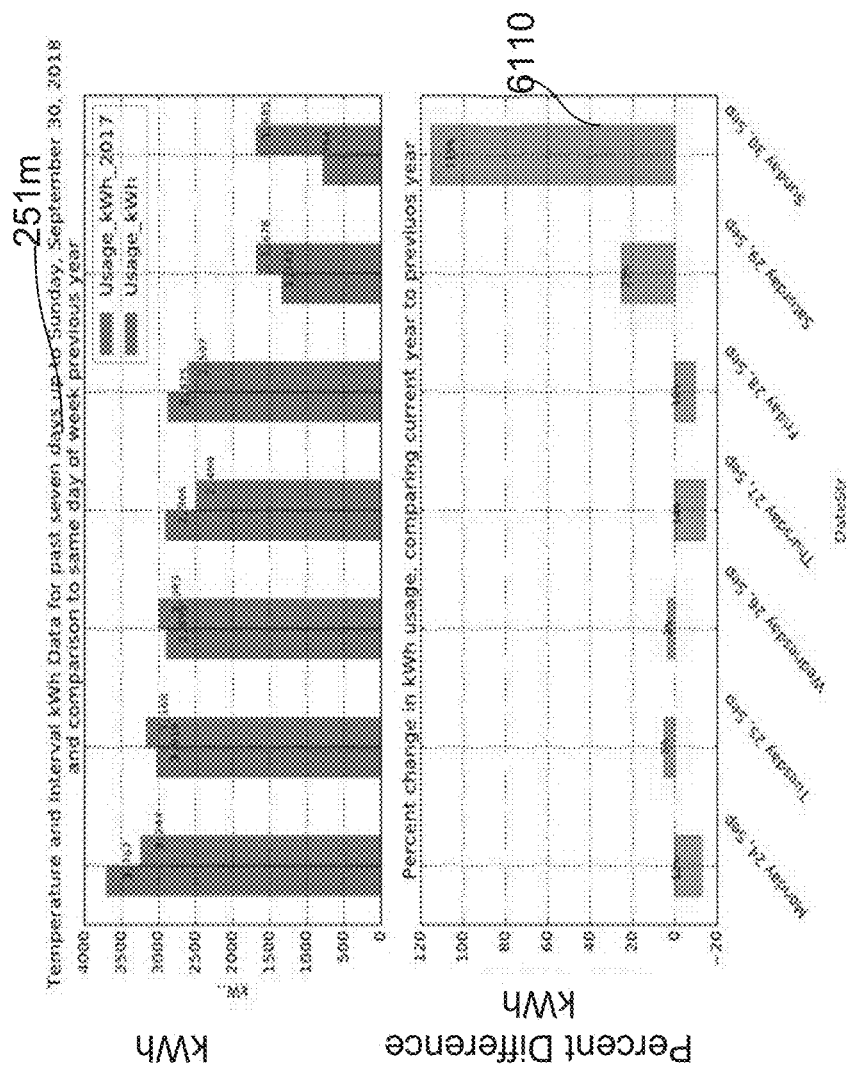

In FIG. 6I, chart 251m created with the dynamic energy model shows the past 7 days total kWh and percent change bar graphs. The client 160 can quickly view the building performance as compared to last year same weekdays, the client 160 can noticed that during the last 7 days on Tuesday Wednesday Saturday and Sunday used more energy than last year, shown by the red colored bars, with Sunday having the higher percent change 6110.

Figure 6J:
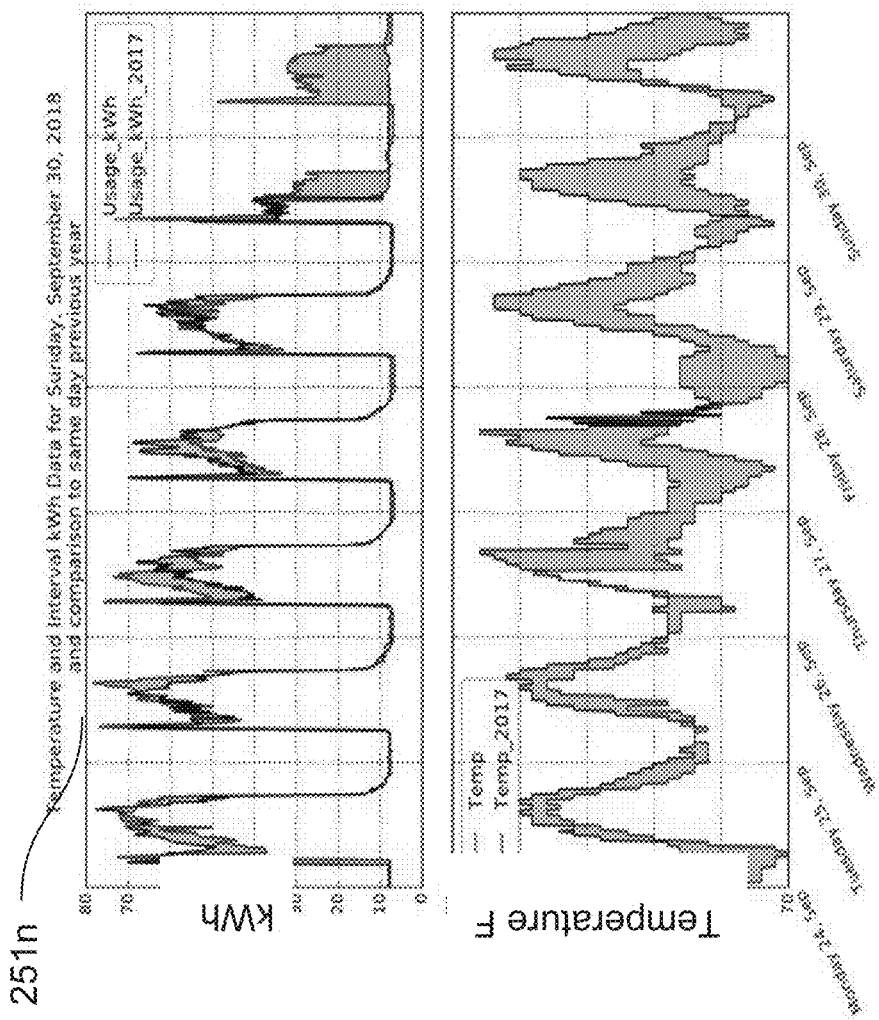

In FIG. 6J, chart 251n created with the dynamic energy model shows the past 7 days line graph of the harvested interval energy data from the graphs bottom section. In this instance, the temperature as compared to last year was less, and therefore there should not have any red shaded areas which mean higher kWh consumption. Therefore HVAC settings need to be a reviewed in order to find out more about the increase in kWh at a lower temperature demand.

As a result of using the method, the client 160, the property manager, for 800 Wilcrest Office Building, noticed that the heating ventilation and air conditioning was on during the weekend. The schedule was reset on the heating ventilation and air conditioning system so that the next Sunday the heating ventilation and air conditioning was not left on.

Example 3

The invention relates to a weather related energy information system that has an administrative server with a processor and non-transitory computer readable medium that connects to the Internet.

A physical structure defined by an address 199a, such as an Independent School District energy manager with 100 facilities in Houston, Tex., requests to have the weather related energy information system. FIG. 3A depicts the properties 199a. From the user interface 165, the client 160 can view in details all interactive graphs for the 100 facilities.

The Independent School District will utilize energy portals and temperature portals, such as the IAH George Bush Intercontinental Airport weather stations portal and Centerpoint energy portals. As illustrated in FIG. 3C, the heat map of the airport and can get a sense of the temperature patterns for the last 30 days.

Each facility has a smart meter mounted to it and in communication with the network.

A computer is connected to the network for viewing at least two interactive graphs namely, a 30 day heat map FIG. 6 and a yearly heat map using conditioned harvested data produced by the administrative server for each of the 100 facilities.

The server crawls through the energy portal of Centerpoint and the temperature portal of the airport and harvests energy interval data and temperature interval data by the facility defined by an address.

The server saves the harvested information in a dynamic database in the non-transitory computer readable medium connected to the administrative processor forming harvested energy interval and temperature interval data.

Using instruction in the non-transitory computer readable medium of the administrative server, the processor conditions harvested energy interval and temperature interval data forming conditioned harvested data.

Using templates stored in memory, the processor generates groups of interactive graphs namely a 30 day heat map FIG. 3A, FIG. 3C using the conditioned harvested data.

The server stores alert threshold values of energy usage in kWh in this case 10%, and energy usage per degree-hour or kWh/DH in this case 10%, inserted by the energy manager and the server generates alert reports using those inserted threshold values.

The server has a script for generating energy metrics for each structure defined by an address 199a, such as Cypress Creek High School at 9815 Grant Rd., Houston 77070.

The server uses a dynamic energy model stored in non-transitory computer readable medium with the conditioned harvested data that performs the steps of: calculating energy metrics for each structure defined by an address in the independent school district for a last or more recent day of conditioned harvested data, a last six days of conditioned harvested data, and a last thirty five days of conditioned harvested data.

The server uses the dynamic energy model stored in non-transitory computer readable medium with the conditioned harvested data to determine percent changes in energy metrics for each structure defined by an address for: a last or more recent day of conditioned harvested data.

The server uses the dynamic energy model stored in non-transitory computer readable medium with the conditioned harvested data to compare the percent change to stored alert threshold values and if the percent change does not exceed the stored alert threshold values automatically generate a daily report 244 and optionally generate an alert report to the client device for each structure defined by an address. FIG. 4A depicts the alert report outline and FIG. 7A-7D depicts the alert report issued for the day of Monday Aug. 27, 2018 for the property defined by the address 9815 Grant Rd., Houston 77070.

This particular report was an alert report due to the energy metrics from the dynamic energy model exceed the threshold, more specifically a percent change of kWh used compared to the average of the last five weekdays that was 23.35% exceeds the threshold of 10%.

In FIG. 7A, chart 251a created with the dynamic energy model illustrates in a bar-chart energy usage of 29,003 kWh for Thursday Sep. 6, 2018 versus the same day previous year of 20,300 kWh and the bar-chart below in red shows the excess of 43% in energy usage, exceeding the threshold of 10% triggering an alarm report.

Figure 7B:
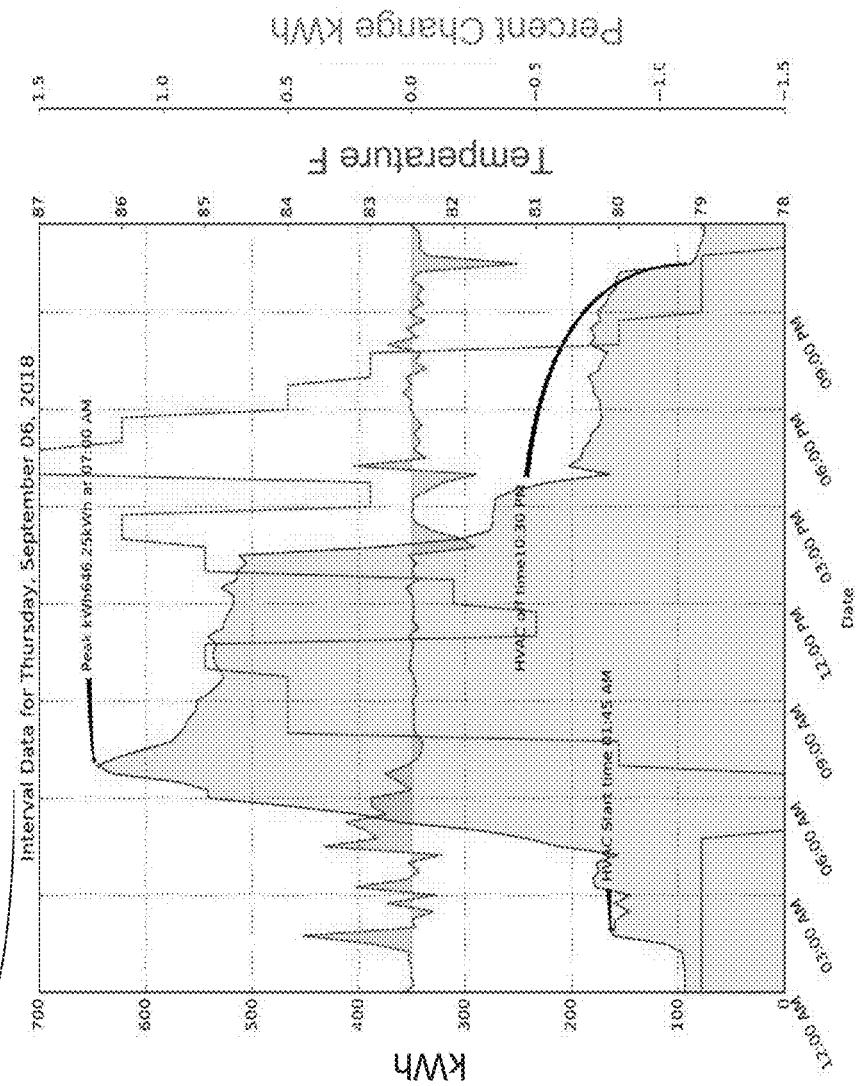

In FIG. 7B, chart 251k created with the dynamic energy model illustrates the 15 minutes interval energy usage in kWh for Thursday Sep. 6, 2018 in 24 hours, showing the first pick at 01:45 hrs inferring the heating ventilation air conditioning system started at that time and the maximum use or pick of 646.25 kWh at 07:00 hrs., and the minimum at 10:30 pm inferring heating ventilation air conditioning system was shut-down.

In FIG. 7C, chart 251l created with the dynamic energy model shows for Thursday Sep. 6, 2018 the 15 minutes interval energy usage in a graph-line a comparison behavior in energy usage with previous year same weekday showing higher used in red color and lower usage in green, line-graph below shows for Thursday Sep. 6, 2018 one hour interval temperature comparison behavior with previous year same weekday, showing higher temperature in red color and lower temperature in green.

Figure 7D:
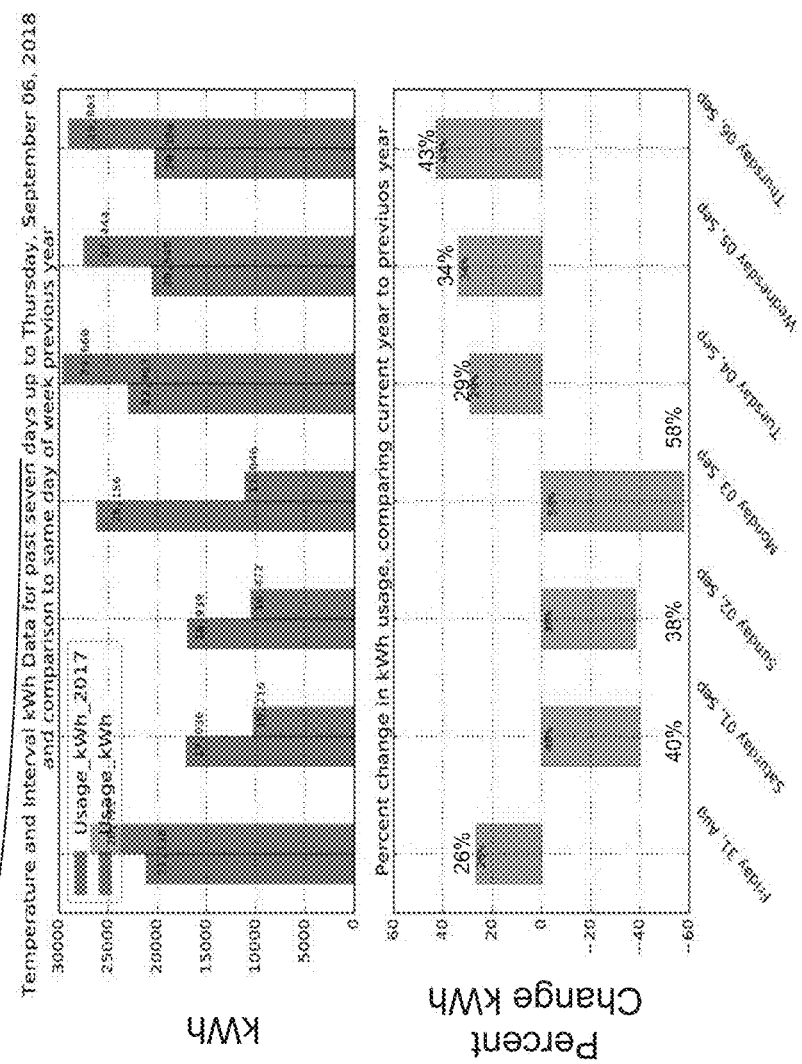

In FIG. 7D, chart 251m created with the dynamic energy model shows a comparative seven days bar-graph of daily energy usage of current year in purple color versus previous year in black color showing higher usage on Thursday Sep. 6, 2018, bar-chart below shows percent difference of energy usage in kWh for the seven days versus same weekdays previous year, showing higher energy usage in red color and lower usage in green.

Figure 7E:
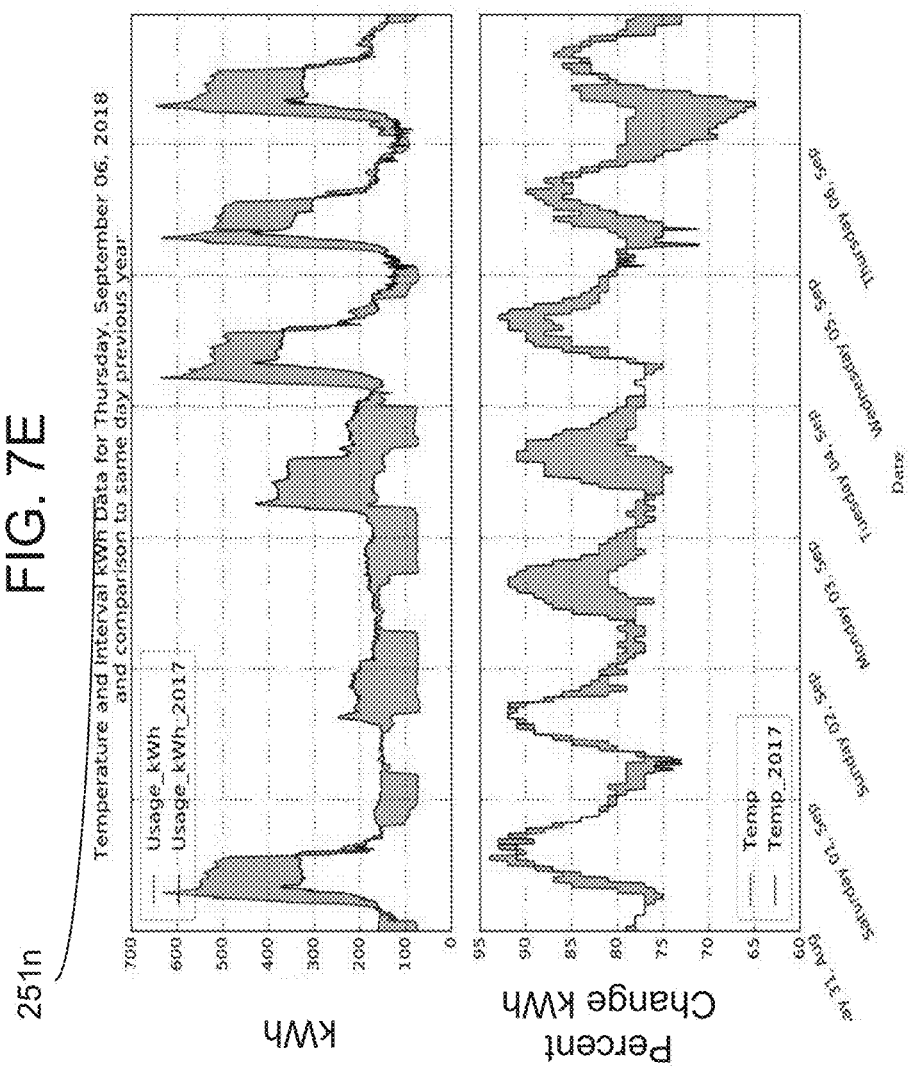

In FIG. 7E, chart 251n created with the dynamic energy model shows a comparative seven days line-graph of daily energy usage of current year in versus same weekdays previous year showing higher usage in red color and lower usage in green color. The line-chart below shows daily temperature of current year versus same weekdays previous year showing higher temperature in red color and lower temperature in green color.

Figure 7F:
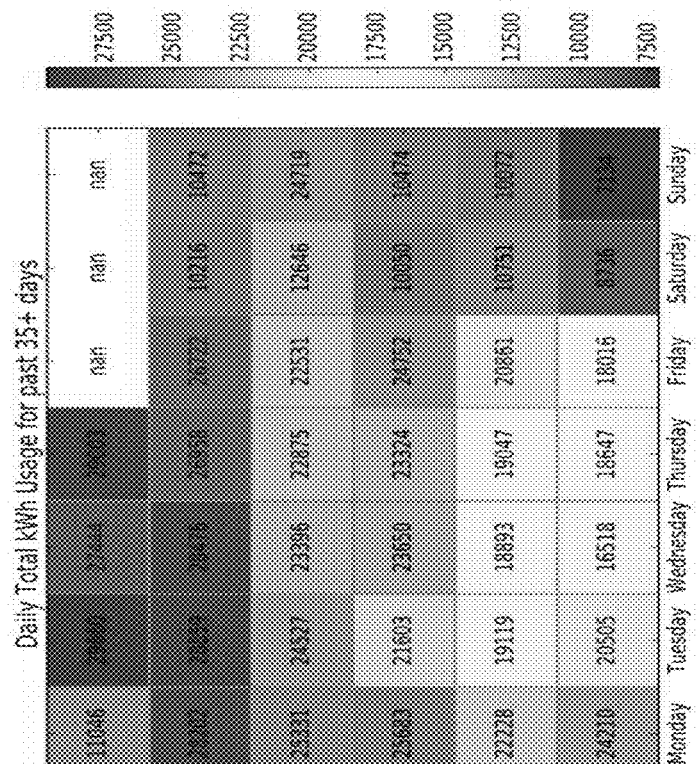

In FIG. 7F, chart 251o created with the dynamic energy model shows a heat map with daily total energy usage in kWh for the last 35 days, in the x-axis are the weekdays and in the y-axis days, each square in the heat map represents the total daily kWh. The heat map colors are related to the scale on the right side scale. Low values are depicted blue, high values in red, middle range values in yellow. The heat map illustrates patterns, in this case the facility operates weekly with weekends off, which can be observed in the heat map.

For the day Thursday Sep. 6, 2018 the kWh was 29,003, the energy model calculates a percent change of 30.82% compared to the average of the last five Thursdays, which exceeds the threshold of 10%.

Figure 7G:
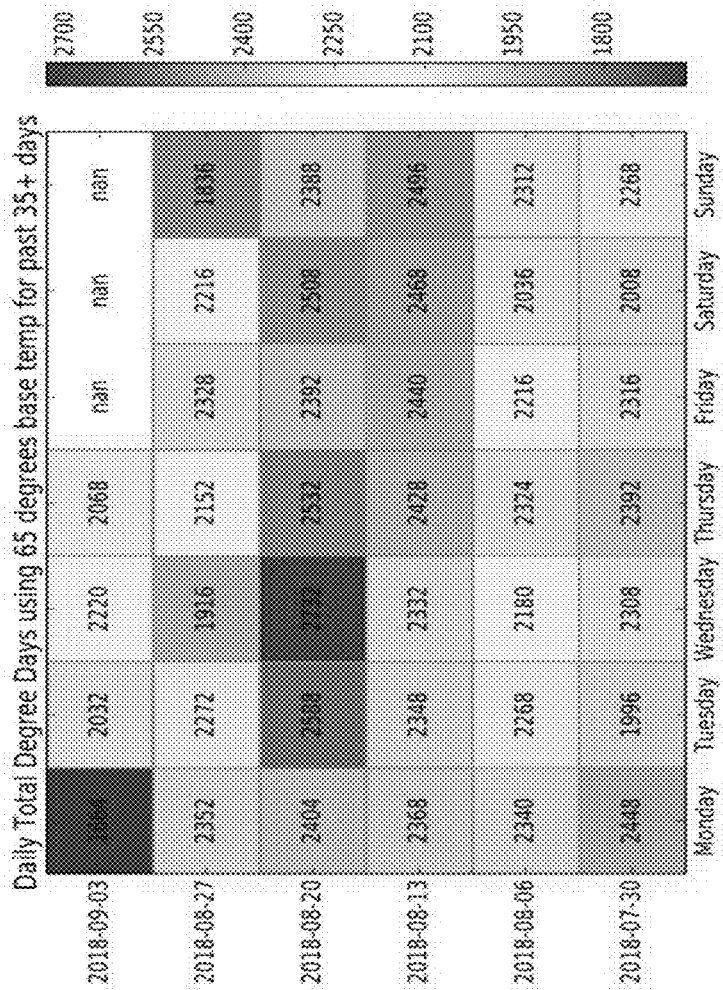

In FIG. 7G, chart 251p created with the dynamic energy model shows a heat map with daily degree-hours for the last 35 days, in the x-axis are the weekdays and in the y-axis days, each square in the heat map represents the total daily degree hours. The heat map colors are related to the scale on the right side scale. Low values are depicted blue, high values in red, middle range values in yellow. Degree-hours are calculated using 65 Fahrenheit degrees as base temperature per every hour of a day.

Figure 7H:
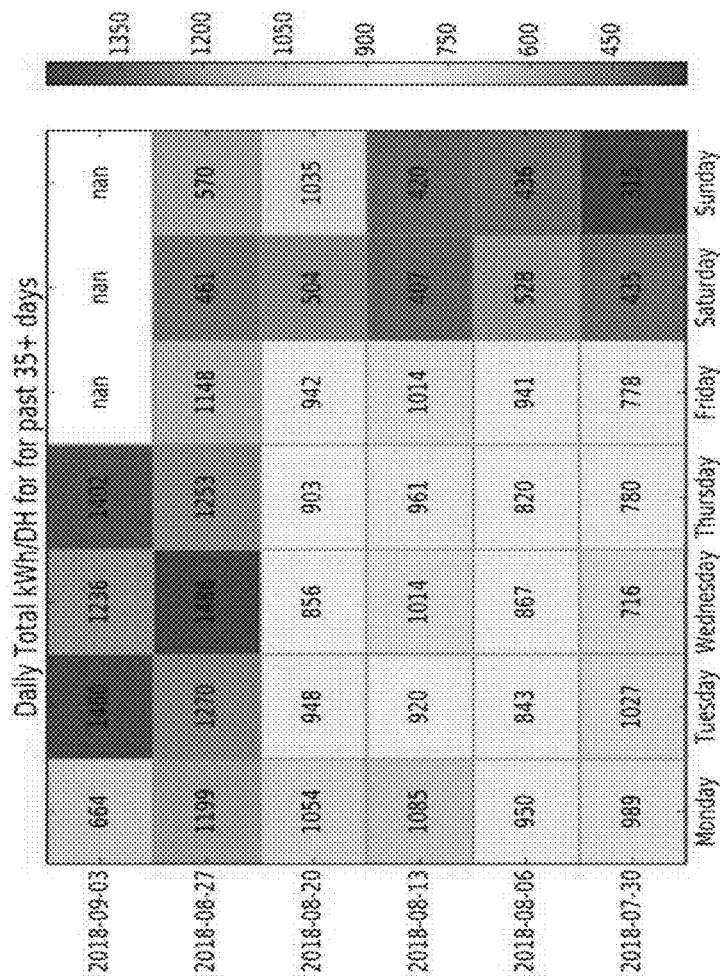
Figure 7L:
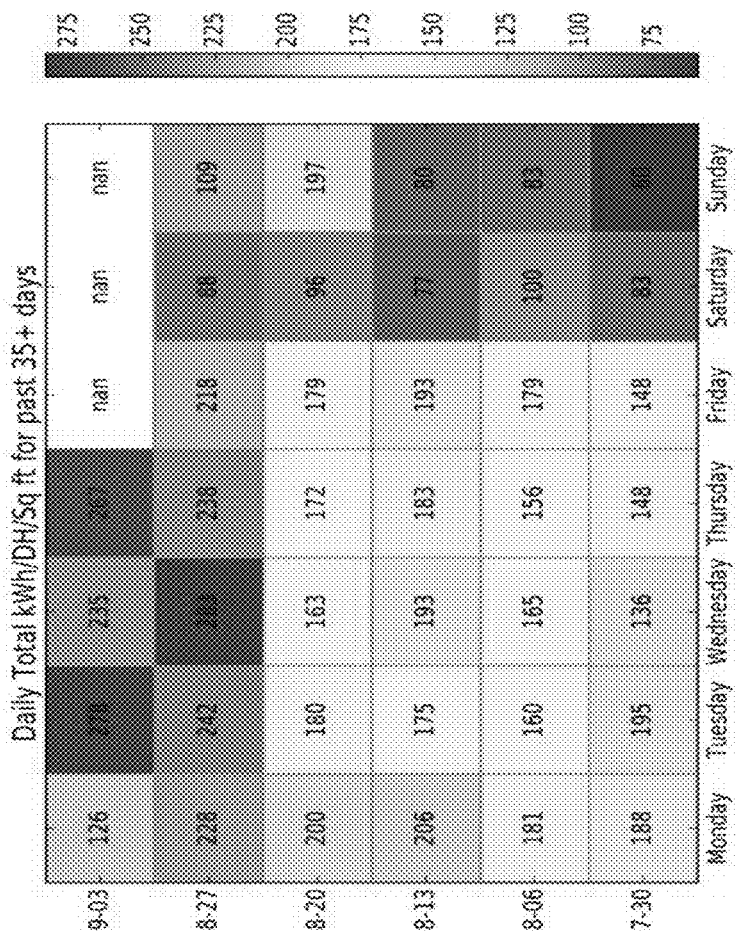

In FIG. 7H, chart 251q created with the dynamic energy model shows a heat map with daily total energy usage per degree-day in kWh/DH for the Thursday Sep. 6, 2018 last 35 days, in the x-axis are the weekdays and in the y-axis Days, each square in the heat map represents the total daily kWh/DH. The heat map color is related to the scale on the right side scale. Low values are depicted blue, high values in red, middle range values in yellow. For Thursday Sep. 6, 2018 the kWh/DH was 1402. The energy model calculated a percent change of 48.61% compared to the average of the last five Tuesdays, which cross the threshold of 10% triggering an alert report.

In FIG. 7I, chart 251r shows a heat map with daily total energy usage in kWh/DH/SqFt for the last 35 days, in the x-axis are the weekdays and in the y-axis Days, each square in the heat map represents the total daily kWh/DH/SqFt. The heat map colors are related to the scale on the right side scale. The kWh/DH/Sq Ft value is multiplied by a constant and is related to the right side color scale. Low values are depicted blue, high values in red, middle range values in yellow, the highest value of 228 kWh/DH/Sq Ft related to the last five Thursdays confirm the energy usage anomaly of Thursday Sep. 6, 2018.

While these embodiments have been described with emphasis on the embodiments, it should be understood that within the scope of the appended claims, the embodiments might be practiced other than as specifically described herein.

What is claimed is:

1. An automated method for managing weather related energy usage comprising:
   in each of a plurality of physical structures, each of the physical structures being defined by an address:
   electronically connecting a processor and a non-transitory computer readable medium to a network;
   installing a dynamic energy model in the non-transitory computer readable medium;
   inputting the address for the physical structure into the dynamic energy model;
   electronically connecting the processor to the Internet; and
   electronically connecting at least one client device having a client device processor and display to the network, each client device for receiving over the network and displaying at least two interactive graphs and alert reports produced by the dynamic energy model for the physical structure while simultaneously using data from a plurality of pre-existing weather station portals and a plurality of pre-existing energy portals,
   wherein each of the plurality of pre-existing energy portals provide a continuous stream of at least fifteen minute interval energy usage data for each of the plurality of physical structures, and each of the plurality of pre-existing weather station portals provide a continuous stream of at least 60 minute interval ambient weather data external to each of the plurality of physical structures from a plurality of devices including at least one pre-existing smart meter, wherein the at least one pre-existing smart meter is located within a preset distance from the address of the each of the plurality of physical structures, and
   wherein the dynamic energy model comprises instructions, which when executed by a processor performs the steps of:
   recursively crawling by browsing the Internet to search for website portals that provide data that are collected at locations within a predetermined distance from the address of the physical structure,
   harvesting and compiling weather data from the data provided by the website portals that are found, the weather data including one of dew point, humidity, wind speed, wind direction, pressure, precipitation, or ambient temperature data within the predetermined distance from the address of the physical structure external to the physical structure, and energy interval usage data at predefined intervals;
   conditioning the harvested energy interval usage data and weather data to form conditioned harvested data, wherein conditioning includes instructions for cleaning, indexing, and slicing the harvested data;
   using preset threshold values stored in the dynamic energy model to generate the alert reports for the physical structure;
   generating groups of interactive graphs using the conditioned harvested data and the generated alert reports for the physical structure;
   transmitting the groups of interactive graphs with the alert reports to the at least one client device for continuous monitoring and control;
   calculating and storing energy metrics for the physical structure including:
     a day of conditioned harvested data;
     a group of six days of conditioned harvested data; and
     a group of thirty-five days of conditioned harvested data;
   applying statistical modeling utilizing filtering to remove outliers in the stored energy metrics providing improved energy metrics;
   determining percent changes in the improved energy metrics for the physical structure for one day of conditioned harvested data and for a group of days of conditioned harvested data simultaneously;
   comparing a percent change to the preset threshold values, and if the percent change does not exceed the preset threshold values automatically generating a daily report and if the percent change exceeds the preset threshold values generate an alert report to the client device for the physical structure;
   acquiring a previous conditioned harvested data generated at a same time during a previous year at a same day of the previous year;
   comparing the conditioned harvested data with the acquired previous conditioned harvested data;
   identifying a scheduling error in an operation of an energy consumption system contributing to the conditioned harvested data;
   generating the alert report, based on the identified scheduling error; and generating a heat map representing energy usage during a predetermined time period to identify the scheduling error,
    wherein the scheduling error is identified by:
        comparing a current day average load profile during which the weather-related energy usage data is generated, and during which the energy consumption system is not operating, with a previous year average load profile acquired during a same month of the previous year; and
        identifying the scheduling error upon the current day average load profile exceeding the previous year average load profile over a predetermined threshold, and
    wherein it is determined that the energy consumption system is not operating based on determining a maximum percentage change and a minimum change in the fifteen minute interval data that is captured for a day during which the fifteen minute interval data is obtained.

2. The method of claim 1, further comprising activating harvesting of energy usage and temperature internal data at a preset start time.

3. The method of claim 1, further comprising using a counter in the dynamic energy model to identify a quantity of physical structures to be monitored.

4. The method of claim 3, further comprising collecting weather data from airports or a weather station within from 60 miles to 100 miles of each physical structure.

5. The method of claim 1, wherein the alert report defines each threshold value exceeded by hour and percent change in energy usage by hour for each physical structure.

6. The method of claim 1, wherein a maximum energy usage day and a minimum energy usage day are calculated by the dynamic energy model and included in the interactive graphs.

7. The method of claim 1, wherein cooling and heating degrees days are highlighted and presented on the interactive graphs.

8. The method of claim 1, wherein the dynamic energy model resamples energy data and the ambient temperature data in 24-hour intervals to create a 24-hour report.

9. The method of claim 1, wherein the dynamic energy model gathers user information and physical attributes of physical structures and presents the user information in the interactive graphs.

10. The method of claim 1, further comprising generating by the dynamic energy model, a dictionary of energy metrics to use with the interactive graphs.

11. The method of claim 1, further comprising using the dynamic energy model to harvest energy data at a first data harvesting rate and temperature data at a second data harvesting rate from each portal.

12. The method of claim 1, further comprising using a standard base temperature of 60 degrees Fahrenheit degrees and temperature interval data every 15 minutes to determine temperature degree values for use in the interactive graphs.

13. The method of claim 1, further comprising generating sets of historical monthly energy heat maps that enable visualization of a last 30 days for energy usage by hour per day with a color dependent value related to a color palette by the dynamic energy model.

14. The method of claim 1, further comprising generating monthly historical heat maps to identify energy patterns anomalies and identify opportunities of energy conservation for the physical structure by the dynamic energy model.

15. The method of claim 1, further comprising using the dynamic energy model to map resampled energy data to comparable days of a week and overlapping 365-day data sets on the map to compare a current year versus a previous year by month, by day, and by hour for each physical structure.

16. The method of claim 1, further comprising using the dynamic energy model to calculate changes in energy metrics related to equipment startup and equipment shutdown times for a physical structure.

17. The method of claim 1, wherein the dynamic energy model calculates energy metrics for a physical structure, and wherein the energy metrics include: total energy use for one day, total energy use for six days, and total energy usage for thirty five days; maximum energy values for one day, maximum energy values for any six days and maximum energy value for any thirty five days; minimum energy values for one day, minimum energy values for any six days, and minimum energy values for any thirty five days, and mean energy use for any group of days.

18. An energy management system comprising:
    a plurality of physical structures that generates energy usage data for the respective physical structures, the energy data being gathered by a pre-existing energy portal website;
    at least one weather station distanced from the physical structures and generating weather data for the physical locations of the physical structures;
    a server configured to:
    recursively crawl the Internet to search for the plurality of energy portals websites that provide a fifteen minute interval data, recursively crawl the Internet to search for a pre-existing weather portal website that provides a sixty minutes interval weather data that are collected at locations within a predetermined distance from an address of the respective one of the plurality of physical structures, and the at least one weather station using a dynamic energy model to process and analyze the generated energy usage data and the generated weather data to generate weather-related energy usage data,
    acquire a previous weather-related energy usage data generated at a same time during a previous year at a same day of the previous year,
    compare the generated weather-related energy usage data with the acquired previous weather-related energy usage data,
    identify a scheduling error in an operation of an energy consumption system contributing to the generated weather-related energy usage data, and
    generate an alert report, based on the identified scheduling error;
    generate a heat map representing energy usage during a predetermined time period to identify the scheduling error,
        wherein the scheduling error is identified by:
            comparing a current day energy usage data during which the weather-related energy usage data is generated, with a previous year energy usage data acquired during the same day of the previous year; and
            identifying the scheduling error upon the current day energy usage data exceeding the previous year weather-related energy usage data over a predetermined threshold, and
        wherein it is determined that the energy consumption system is not operating based on a pre-determined maximum percentage change and a minimum change in the fifteen minute interval data that is captured for a day during which the fifteen minute interval data is obtained, and a client device communicating with the server to through which the generated alert report is sent.

19. An automated method for managing weather related energy usage comprising:

crawling the Internet to search for a plurality of energy portals websites that provide data that are collected at locations within a predetermined distance from an address of respective one of a plurality of physical structures;

using a dynamic energy model to acquire energy usage data for the respective one of the plurality of physical structures, each energy portal associated with the respective one of the physical structures;

recursively crawling the Internet to search for at least one weather station using the dynamic energy model to acquire weather data for the physical locations of the physical structures, the weather station being physically distanced from the physical structures;

analyzing the acquired energy usage data and the acquired weather data to generate weather-related energy usage data for the physical structures;

acquiring a previous weather-related energy usage data generated at a same time during a previous year at a same day of the previous year;

comparing the generated weather-related energy usage data with the acquired previous weather-related energy usage data;

identifying a scheduling error in an operation of an energy consumption system contributing to the generated weather-related energy usage data;

generating an alert report, based on the identified scheduling error, wherein the weather data includes one of temperature, dew point, humidity, wind speed, wind direction, or pressure precipitation; and generating a heat map representing energy usage during a predetermined time period to identify the scheduling error, wherein the scheduling error is identified by:

comparing a current day energy usage data during which the weather-related energy usage data is generated, with a previous year energy usage data acquired during the same day of the previous year; and identifying a scheduling error upon the current day energy usage data exceeding the previous year weather related energy usage data over a predetermined threshold, and wherein it is determined that the energy consumption system is not operating based on a pre-determined maximum percentage change and a minimum change in the energy usage data that is captured for a day during which the energy usage data is obtained.

\* \* \* \* \*